United States Patent
Klose

(10) Patent No.: US 10,493,534 B2
(45) Date of Patent: Dec. 3, 2019

(54) DEVICE, METHOD, AND CUTTING PLATE FOR MACHINING A ROTATING WORKPIECE

(71) Applicant: VANDURIT GMBH HARTMETALL UND DIAMANTWERKZEUGE, Leverkusen (DE)

(72) Inventor: Jürgen Klose, Düsseldorf (DE)

(73) Assignee: VANDURIT GMBH HARTMETALL UND DIAMANTWERKZEUGE, Leverkusen (DE)

( * ) Notice: Subject to any disclaimer, the term of this patent is extended or adjusted under 35 U.S.C. 154(b) by 143 days.

(21) Appl. No.: 15/551,515

(22) PCT Filed: Feb. 16, 2016

(86) PCT No.: PCT/EP2016/053236
§ 371 (c)(1),
(2) Date: Aug. 16, 2017

(87) PCT Pub. No.: WO2016/135005
PCT Pub. Date: Sep. 1, 2016

(65) Prior Publication Data
US 2018/0029134 A1    Feb. 1, 2018

(30) Foreign Application Priority Data

Feb. 24, 2015 (DE) .......... 10 2015 102 603
Jun. 29, 2015 (DE) .......... 10 2015 110 398

(51) Int. Cl.
*B23B 27/16* (2006.01)
*B23B 29/12* (2006.01)
(Continued)

(52) U.S. Cl.
CPC ............. *B23B 3/06* (2013.01); *B23B 1/00* (2013.01); *B23B 5/00* (2013.01); *B23B 27/1611* (2013.01);
(Continued)

(58) Field of Classification Search
CPC ..... B23B 3/167; B23B 1/00; B23B 2200/123; B23B 2200/202; B23B 29/12;
(Continued)

(56) References Cited

U.S. PATENT DOCUMENTS 3,128,657 A    4/1964   Hebert
4,057,884 A * 11/1977   Suzuki .............. B23B 27/00
                                                407/89

(Continued)

FOREIGN PATENT DOCUMENTS

DE        19963897 A1    6/2001
DE        10144649 A1    2/2003
(Continued)

*Primary Examiner* — Sara Addisu
(74) *Attorney, Agent, or Firm* — Lucas & Mercanti, LLP; Klaus P. Stoffel

(57) ABSTRACT

A method and a device for machining a workpiece rotating about a rotational axis. The machining point moves along the cutting edge of a cutting edge plane and the surface to be machined in a rolling movement on an advancement plane not intersected by the rotational axis. A pivot drive implements a large enough pivot angle so that a first workpiece surface is machined by a machining point moving along the first cutting edge in a first machining step. In a second machining step, a second workpiece surface is machined, wherein the machining point moves along the second cutting edge and the second workpiece surface. The cutting edge has a curvature radius smaller than the distance from the pivot axis of the holder to the cutting edge. The holder can additionally be displaced on the advancement plane with a (Continued)

movement component in a direction transverse to the rotational axis.

29 Claims, 14 Drawing Sheets

(51) Int. Cl.
    *B23Q 1/64*          (2006.01)
    *B23B 3/06*          (2006.01)
    *B23B 29/24*         (2006.01)
    *B23B 1/00*          (2006.01)
    *B23B 5/00*          (2006.01)
    *G05B 19/18*        (2006.01)

(52) U.S. Cl.
    CPC ............ B23B 29/12 (2013.01); B23B 29/242 (2013.01); B23Q 1/64 (2013.01); G05B 19/182 (2013.01); *B23B 2200/123* (2013.01); *B23B 2200/202* (2013.01); *B23B 2200/208* (2013.01); *B23B 2200/28* (2013.01); *B23B 2220/123* (2013.01); *B23B 2260/004* (2013.01)

(58) Field of Classification Search
    CPC .......... B23B 2200/208; B23B 2200/28; B23B 2220/123; B23B 2260/004; B23B 27/1611; B23B 29/242; B23B 3/06; B23B 5/00; B23Q 1/64; B23Q 5/22; G05B 19/182
    See application file for complete search history.

(56) References Cited

U.S. PATENT DOCUMENTS

| | | | |
|---|---|---|---|
| 4,218,816 A * | 8/1980 | Dormehl | B23B 29/242 414/730 |
| 4,636,117 A | 1/1987 | Shikata | |
| 4,683,626 A | 8/1987 | Steiner | |
| 4,723,219 A * | 2/1988 | Beyer | G05B 19/4067 318/572 |
| 4,995,300 A * | 2/1991 | Kaplan | B23Q 35/102 82/12 |
| 5,417,130 A * | 5/1995 | Dorsch | B23B 1/00 82/1.11 |
| 5,713,253 A | 2/1998 | Date et al. | |
| 5,765,270 A * | 6/1998 | Schrod | B23C 3/06 29/27 R |
| 6,237,452 B1 * | 5/2001 | Ludwick | B24B 13/0055 82/118 |
| 6,244,789 B1 * | 6/2001 | Tsuda | B23B 27/007 407/107 |
| 6,457,391 B1 | 10/2002 | Yamazaki et al. | |
| 6,565,497 B1 | 5/2003 | Yamazaki et al. | |
| 6,578,453 B1 | 6/2003 | Hatano et al. | |
| 6,775,586 B2 * | 8/2004 | Shibata | G05B 19/41 409/183 |
| 7,216,571 B2 * | 5/2007 | Schreiber | B23B 1/00 407/69 |
| 7,416,372 B2 | 8/2008 | Hyatt et al. | |
| 8,186,251 B2 * | 5/2012 | Kummer | B23B 1/00 408/180 |
| 9,180,524 B2 * | 11/2015 | Campbell | B23B 29/125 |
| 2002/0123823 A1 | 9/2002 | Harada et al. | |
| 2003/0089204 A1 * | 5/2003 | Schreiber | B23B 1/00 82/1.11 |
| 2003/0143047 A1 | 7/2003 | Ishii et al. | |
| 2004/0003690 A1 * | 1/2004 | Katoh | B23Q 5/045 82/121 |
| 2005/0160887 A1 * | 7/2005 | Erickson | B23B 1/00 82/121 |
| 2006/0120816 A1 * | 6/2006 | Morimoto | B23B 1/00 409/132 |
| 2009/0182451 A1 | 7/2009 | Jennessen et al. | |
| 2010/0124465 A1 | 5/2010 | Morrison et al. | |
| 2011/0056342 A1 * | 3/2011 | Fiedler | B23B 27/1696 82/123 |
| 2015/0128773 A1 * | 5/2015 | Schneider | B24B 13/00 82/1.11 |
| 2016/0288214 A1 * | 10/2016 | Ishihara | B23B 5/36 |
| 2017/0129018 A1 * | 5/2017 | Ishihara | B23B 29/323 |
| 2018/0200802 A1 * | 7/2018 | Kanada | B23B 5/36 |
| 2018/0326551 A1 * | 11/2018 | Oakes, Jr. | B24B 3/36 |

FOREIGN PATENT DOCUMENTS

| | | |
|---|---|---|
| DE | 102004026675 B3 | 5/2005 |
| DE | 10393255 T5 | 8/2005 |
| DE | 102005037665 B3 | 1/2007 |
| DE | 102006011300 B3 | 9/2007 |
| DE | 102007033820 A1 | 1/2009 |
| FR | 1399654 A | 5/1965 |
| FR | 2483819 A1 | 12/1981 |
| GB | 2195928 B3 | 4/1988 |
| JP | 2009241221 A * | 10/2009 |
| SU | 1033266 A1 | 8/1983 |

* cited by examiner

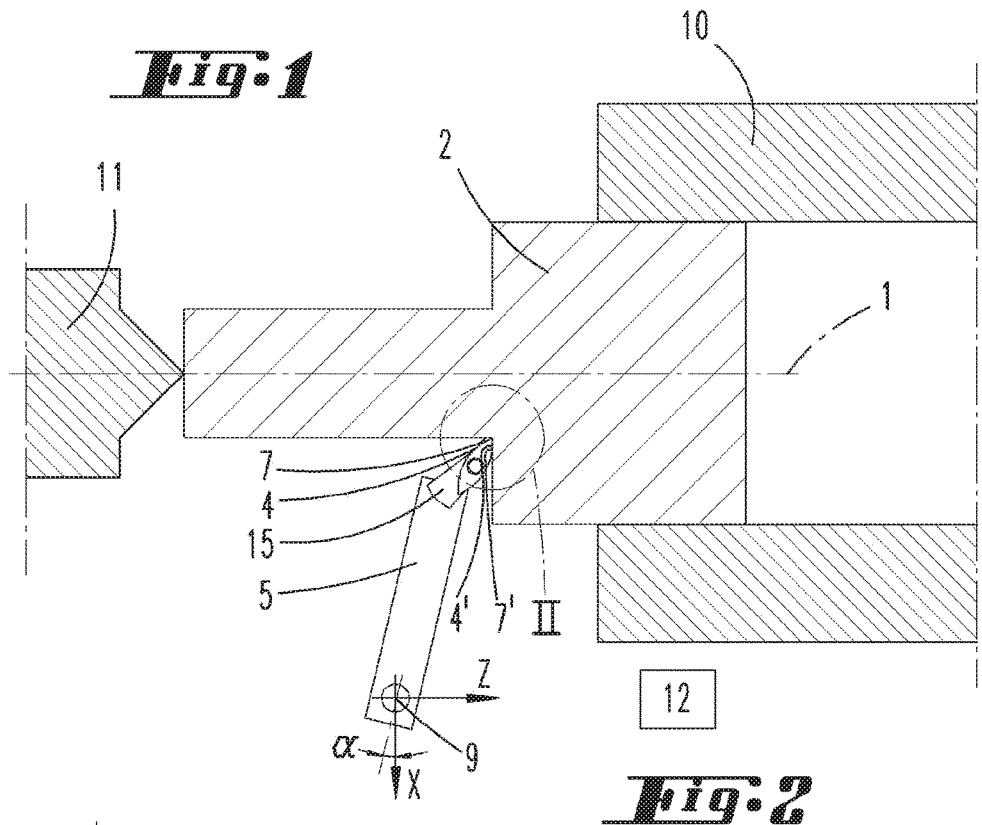
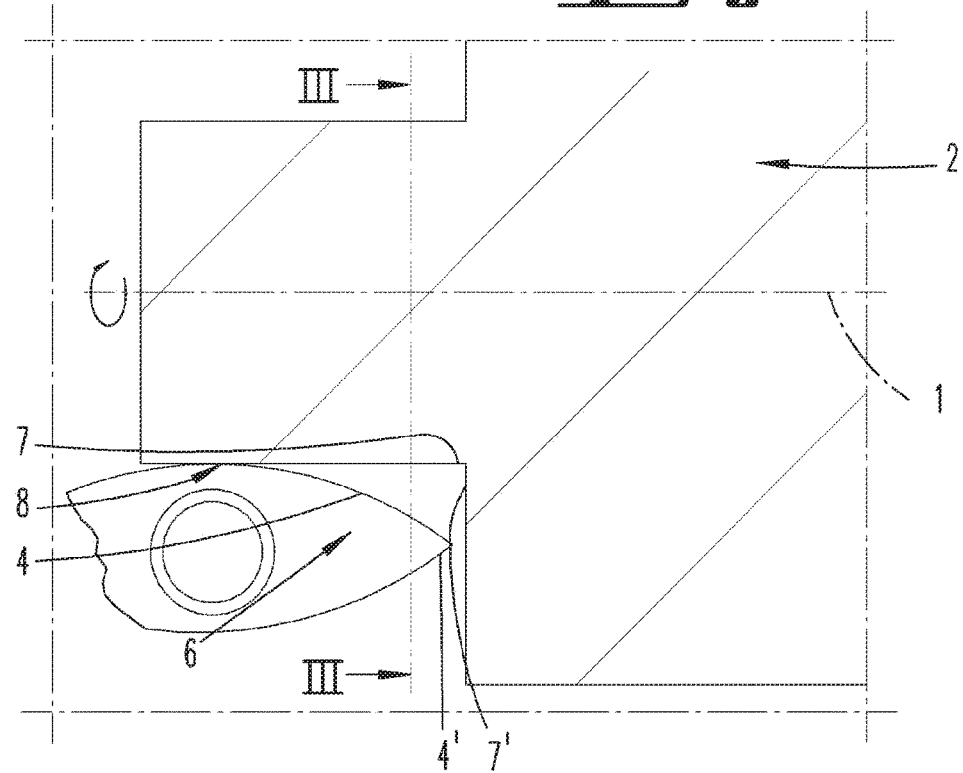

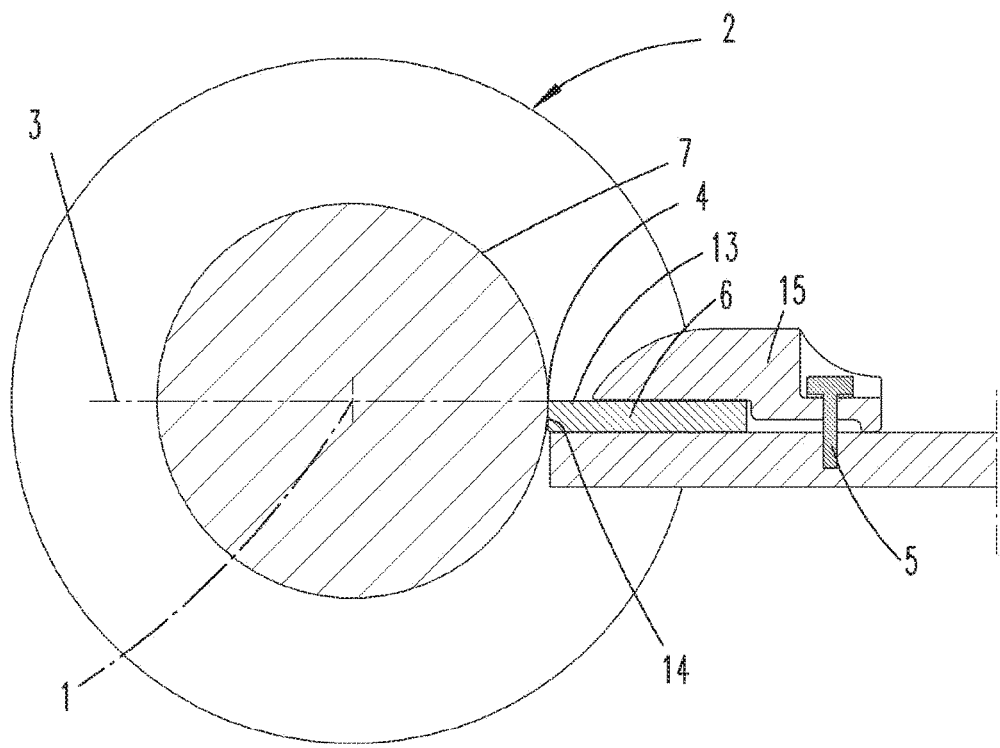

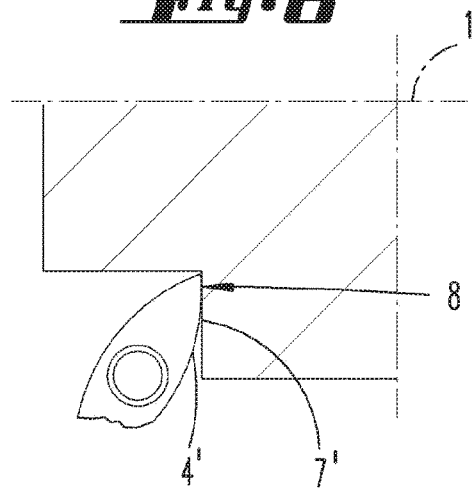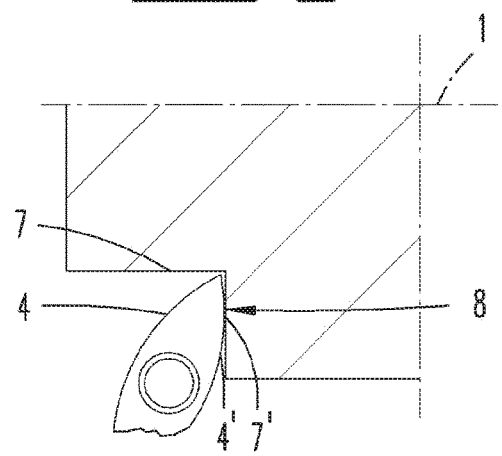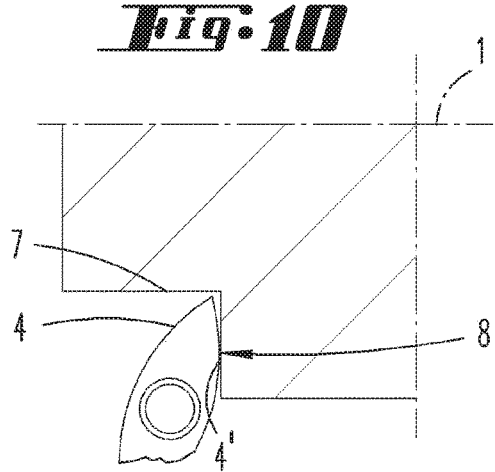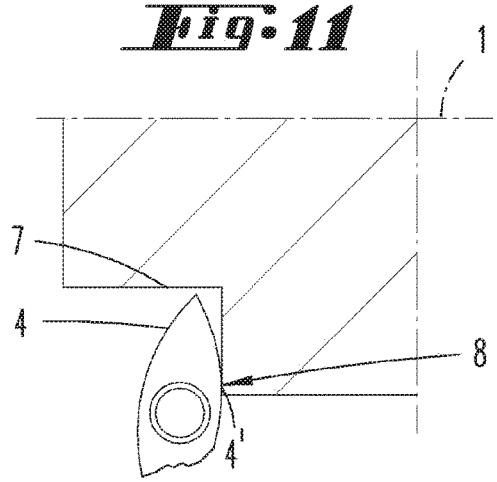

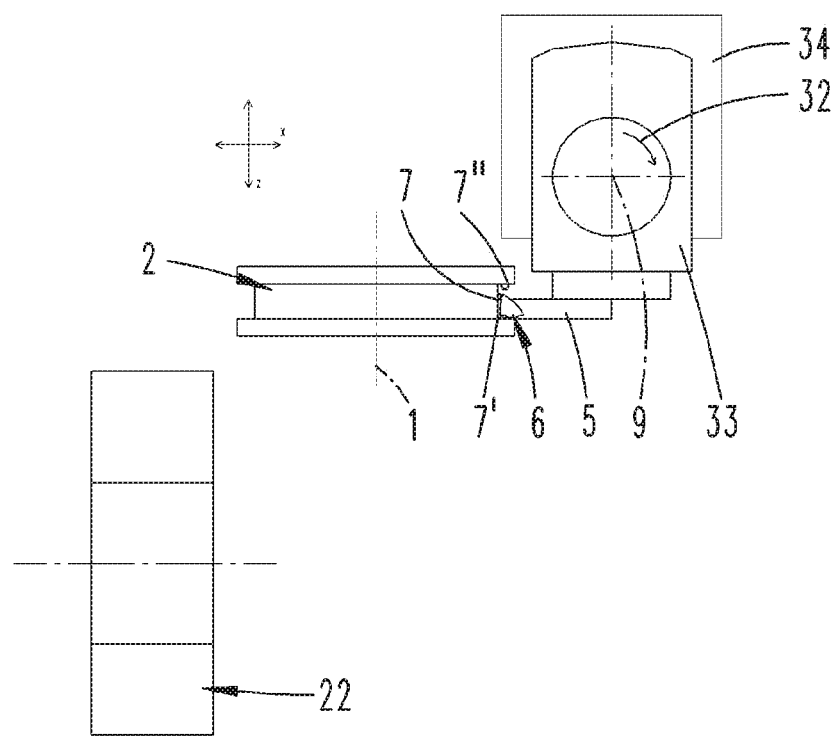

DEVICE, METHOD, AND CUTTING PLATE FOR MACHINING A ROTATING WORKPIECE

The present application is a 371 of International application. PCT/EP2016/053236, filed Feb. 16, 2016, which claims priority of DE 10 2015 102 603.1, filed Feb. 24, 2015, and DE 10 2015 110 398.2, filed Jun. 29, 2015, the priority of these applications is hereby claimed and these applications are incorporated herein by reference.

BACKGROUND OF THE INVENTION

The invention relates to a device for machining a workpiece rotating about a rotational axis, wherein a cutting plate is used, which has at least two cutting edges, which extend in a cutting edge plane and which transition into one another in a tip, if applicable by forming a fillet, wherein the cutting plate, which is fastened to a holder, can be engaged with a surface to be machined of the workpiece and the holder can be pivoted about a pivot axis, which is positioned perpendicular in the advancement plane, by a control device, by using an advancement drive and a pivot drive during the machining and can be displaced with respect to the workpiece in the direction of the rotational axis with a movement component in such a way that the machining point moves along the cutting edge and the surface to be machined in a rolling movement in an advancement plane, which is not intersected by the rotational axis.

The invention furthermore relates to a method for machining a workpiece rotating about a rotational axis, in the case of which a cutting plate is used, which has at least two cutting edges, which extend in a cutting edge plane and which transition into one another in a tip, if applicable by forming a fillet, wherein the cutting plate, which is fastened to a holder, is engaged with a surface to be machined of the workpiece, and the holder is pivoted about a pivot axis, which positioned perpendicular in the advancement plane by a control device, by using an advancement drive and a pivot drive during the machining and is displaced with respect to the workpiece in the direction of the rotational axis with a movement component in such a way that the machining point moves along the cutting edge and the surface to be machined in a rolling movement in an advancement plane, which is not intersected by the rotational axis.

The invention further relates to a device for machining a workpiece rotating about a rotational axis comprising a holder, which can be pivoted about a pivot axis by using a pivot drive and which holds a cutting plate, which has at least one cutting edge, which is curved in a cutting edge plane, and by using an advancement drive, by means of which the pivot drive can be displaced in the advancement plane, which runs perpendicular to the pivot axis extension and which is not intersected by the rotational axis, with a movement component parallel to the rotational axis with respect to the workpiece, wherein the advancement drive and the pivot drive can be movement-controlled by a control device in such a way that a machining point moves along the cutting edge and the surface to be machined of the workpiece in a rolling movement.

The invention further also relates to a method for machining a workpiece rotating about a rotational axis comprising a holder, which can be pivoted about a pivot axis by using a pivot drive and which holds a cutting plate, which has at least one cutting edge, which is curved in a cutting edge plane, and by using an advancement drive, by means of which the pivot drive is displaced in the advancement plane, which runs perpendicular to the pivot axis extension and which is not intersected by the rotational axis, with a movement component parallel to the rotational axis with respect to the workpiece, for machining a workpiece rotating about a rotational axis comprising a holder, which can be pivoted about a pivot axis by using a pivot drive and which holds a cutting plate, which has at least one cutting edge, which is curved in a cutting edge plane, and by using an advancement drive, by means of which the pivot drive is movement-controlled in the advancement plane, which runs perpendicular to the pivot axis extension and which is not intersected by the rotational axis, with a movement component parallel to the rotational axis with respect to the workpiece, in such a way that a machining point moves along the cutting edge and the surface to be machined of the workpiece in a rolling movement.

The invention furthermore relates to a cutting plate for carrying out the method or for use on the device comprising two cutting edges, which in each case extend along one of two lines of curvatures, which intersect in a point of intersection and which transition into one another in the area of the point of intersection, if applicable by forming a fillet.

PRIOR ART

A generic device or a generic method, respectively, is described by DE 10 2006 011 300 B3. In an X-Z plane, a tool carrier can be displaced with respect to a workpiece carrier. The workpiece carrier has a chuck, into which a workpiece is inserted. The chuck can be rotationally driven about a rotational axis. The rotational axis runs in the advancement plane. A pivot axis, which is located on an arm of the workpiece carrier, runs in the Y axis which runs perpendicular to the X-Z axis. A holder of a cutting insert can be pivoted about this pivot axis, for the purpose of which provision is made for a pivot drive. The cutting plate has a cutting edge extending on a circular arc line, wherein the center of the circular arc line coincides with the pivot axis. By using the cutting plate, a rolling section can be carried out by means of a linear displacement of the tool carrier with respect to the tool carrier in the direction of the rotational axis and by means of a simultaneous pivoting of the cutting plate.

GB 2 195 928 A describes a holder, which can be pivoted about a pivot axis and which forms a rake edge on its free end, so that a circular arc-shaped surface can be machined by using the holder.

U.S. Pat. No. 6,565,497 B1 describes a complex machine tool, by means of which milling as well as rotational machining are possible. A milling tool, which extends around a pivot axis perpendicular to the advancement plane and can be pivoted, is located on a tool carrier, which can be displaced in an advancement plane.

A machining method for creating inner surfaces is known from U.S. Pat. No. 6,578,453 B1.

DE 199 63 897 B4, DE 10 2004 026 675 B3, DE 101 44 649 or DE 10 2007 033 820 A1 in each case describe a method for rotationally machining rotationally symmetrical workpieces and a corresponding device as well as a cutting plate, which can be used for the rotational machining. In the case of the rotational machining, the cutting tool is rotated about an axis, which runs parallel to the rotational axis of the workpiece, so that a machining point moves along the surface to be machined as well as along the cutting edge.

A machine tool, in the case of which a cutting plate is fastened to the end of a holder so as to be pivotable about a pivot axis in response to the rotational machining, is known from DE 10 2005 037 665 B3. The pivot axis runs parallel to the rotational axis of the workpiece here.

DE 103 93 255 T5 describes a machine tool for the rotational machining of a workpiece, in the case of which a diamond-shaped cutting plate is pivoted during the advancement about a pivot axis, which extends transversely to the rotational axis of the workpiece. The cutting angle or the flank relief angle is to be changed through this during the advancement.

U.S. Pat. No. 5,713,253 describes a device and a method for the rotational machining of a workpiece, in the case to which provision is made for a pivot axis, which extends parallel to the rotational axis, for pivoting a tool holder, so that the cutting plate can be pivoted in response to the rotational machining.

U.S. Pat. No. 6,775,586 B2 describes a tool holder, which can be displaced on a cross table, which holds a milling tool, the axis of which can be pivoted in the room.

SUMMARY OF THE INVENTION

The invention is based on the object of further developing the known method, the known device and the cutting plate, which can be used for this purpose, in a manner, which is advantageous for the use thereof, and to broaden the application range thereof.

The object is solved by means of the invention specified in the claims, wherein the subclaims do not only represent advantageous further developments of the independent claims, but equally also have an independent significance for solving the object.

The invention relates to a rotational machining method, in the case of which a workpiece is rotationally driven continuously and a cutting plate is brought into a machining engagement with the workpiece along the surface to be machined. The cutting plate is displaced in such a way with respect to the machine frame and thus with respect to the workpiece that a machining point moves along the workpiece surface to be machined. According to the invention, the cutting plate is to be pivoted about a pivot axis, which positioned perpendicular in the advancement plane/movement plane, either during the machining or between two machining steps. The machine tool according to the invention is a machine for the rotational machining of workpieces and has a pivot axis, which positioned perpendicular to the advancement plane. Particularly preferably, the pivot axis runs perpendicular to the rotational axis, wherein the pivot axis and the rotational axis have a variable center distance and provision is in particular made for the pivot axis to be capable of being displaced in the advancement plane, thus in particular transversely and parallel to the direction of extension of the rotational axis. In this respect, the machine tool can have a cross table arrangement, on which a rotationally rigid actuator is located, by means of which the cutting plate can be pivoted. The actuator can pivot a holder, which has an arm, to the end of which the cutting plate is fastened. It is essential that such a relative displacement can be implemented between cutting plate and workpiece such that the cutting edge of the cutting plate rolls along a surface to be machined of the workpiece. In order to attain this relative movement, the rotational axis of the workpiece can stand still in the room and the cutting plate can displace in the room. It is also possible to fix the cutting plate in the room and to displace the workpiece with respect to the cutting plate in the advancement plane. A combination is also possible, in the case of which the workpiece is displaced in a room direction and the cutting plate is displaced in a different room direction. It is further proposed for a cutting plate to be used, which has a cutting edge, which, in its direction of extension, is curved in a different way than the contour line of the surface to be machined. In the case of a straight or hollow, thus concave contour line of the surface to be machined, the cutting edge is convex and is curved more strongly than the contour line. A spherical surface to be machined can also be machined with a cutting edge, which is curved convexly. The absolute values of the curvature radii of contour line and cutting edge can even be the same in this case. A spherical, thus convex surface, however, can also be machined with a concave cutting edge, which has a weaker curvature. The cutting edge, however, can also run in a straight line and can roll on a spherical surface to be machined. The course of the cutting edge can also follow an elliptical line of curvature or a line of curvature, which is formed by a plurality of radii, which adjoin one another. The cutting edge extends in a cutting edge plane, in which the contour line of the surface to be machined, which has a different curvature, runs as well. Provision is furthermore made for the cutting edge to be moved with an advancement movement component, which rolls along the surface to be machined. A machining point moves along the cutting edge as well as along the contour line of the surface to be machined as a result of the rolling movement. The surface to be machined can be a cylinder surface, a surface of a rotational body, which has a convexly or concavely rounded cross section, or the surface of a truncated cone. Provision is in particular made for the plane normal of the cutting edge plane to run perpendicular to the rotational axis. The rolling movement is then preferably created by a movement of the holder in the cutting edge plane, wherein the holder is pivoted about the pivot axis during this displacement, so that the holder is rotated on an arc path so as to be displaced about a rolling axis, wherein the rolling axis can move along the cutting edge or the contour line of the workpiece, respectively, during the rotational movement. The rotational axis preferably runs inside the cutting edge contour plane. The device according to the invention has a controller, which is set up or which can be set up in such a way that the movement of the cutting plate is located in the cutting edge plane and the cutting edge rolls along the surface to be machined in response to the machining. If the rotational axis of the workpiece is identified as Z axis of a Cartesian space coordinate, the cutting edge plane is preferably located in an X-Z plane. The device can have a cross carriage, which can be displaced in the X-Z plane by means of two spindle drives, which are perpendicular to one another. The cross carriage can support a pivot drive with a pivot axis, which is located in the Y axis, thus perpendicular to the movement plane. The holder can be pivoted about this pivot axis in order to implement the rolling movement. The rolling cutting plate movement can be overlapped by a linear advancement movement in the direction of the contour line of the surface to be machined. The rolling movement, however, can also be overlapped by any advancement movement, which runs along any contour line, so that a pulling cut can be made with a machining point, which moves along the cutting edge. The machining point can thereby move along the cutting edge with a higher or lower speed than it moves along the surface to be machined. This depends on whether the rolling movement is directed in the direction of the additional advancement movement or in opposite direction of the additional advancement movement. The rolling cutting plate movement, however, can also purely be a rolling movement, in the case of which a fixed point on the cutting edge moves along a cycloid. However, by using the device according to the invention for the rotational machining, it is also possible to machine a surface to be machined by removing material in such a way that the cutting plate is not pivoted during the machining. It is only displaced in the movement plane along a contour line and engages with the workpiece in a machining manner with the cutting edge tip. The invention includes a method with at least two machining steps. According to a first machining step, the cutting plate can be slightly pivoted about the pivot axis. A second machining step follows the first machining step, in that the same or preferably a different cutting edge of the cutting plate engages with the workpiece in a machining manner. In the case of this alternative of the invention, a first surface of the workpiece is machined initially and then a second surface of the workpiece, which differs from the first surface. The two surfaces can adjoin one another directly. However, provision is also made for the surfaces, which differ from one another, to be spaced apart from one another in the direction of the rotational axis of the workpiece. Preferably, a first one of the two surfaces is machined with a first cutting edge and a second one of the two surfaces is machined with a second cutting edge, which differs from the first cutting edge. If the two surfaces adjoin one another, it may not be necessary to displace the cutting plate when changing from the machining of the first surface to the machining of the second surface. If the two surfaces to be machined are spaced apart from one another, the cutting plate must be displaced by means of the advancement drive when changing from the machining of the first surface to the machining of the second surface. If two directly adjacent surfaces are machined, a cutting plate is preferably used, in the case of which the two cutting edges meet in a tip. In response to the change, a tip-side cutting edge can be used, which can be rounded. A curved cutting edge can be followed by a so-called wiper cutting edge, which is an edge, which runs in a straight line and which can be engaged in a machining manner in advancement direction downstream from the curved cutting edge, in order to smooth the workpiece surface by means of a slighter machining. The two wiper cutting edges are in particular positioned at an angle of less than 90° with respect to one another. Surface sections of a rotational body, which are positioned at an angle with respect to one another, for example a cone surface adjoining a cylinder jacket surface or a plane surface adjoining a cone surface or cylinder jacket surface, can thus be machined by using the method according to the invention on the device according to the invention. Surfaces, which are located at a distance from one another, can be machined. The creation of an undercut is also possible. When transitioning from the one surface to be machined to the other surface to be machined, the pivot axis is pivoted. Associated therewith, the cutting plate or the holder holding it, respectively, is slightly pivoted so that a cutting edge, which is assigned to the other cutting edge, or a wiper cutting edge, respectively, can perform its surface-smoothing function. The spindle drives and the rotational drive movement are controlled by an electronic controller. In the case of a particularly preferred alternative of a device according to the invention or of a method according to the invention, the cutting edge has two cutting edges, which in each case extend along a line of curvature. The cutting edges extend on lines of curvature, which intersect in the area of a tip of the cutting plate. Said lines of curvature are preferably circular arc lines. The circular arc lines in each case define centers, which form virtual pivot axes. This pivoting movement about the virtual axes is created by means of a synchronous displacement of a pivot drive in the advancement plane with a pivoting of the holder, which holds the cutting plate, about a holder pivot axis assigned thereto. The virtual axes can thereby also displace parallel along the surfaces to be machined. This has the advantage that machining can be carried out with relatively small curvature radii of the cutting edges. The curvature radii of the cutting edges are preferably at least 5 mm and maximally 50 mm, if applicable only 40 mm, optimally maximally 30 mm. The length of the holder, thus the distance between pivot axis of the holder and the cutting edge is larger, preferably several times larger than the cutting edge radius. If a first surface is initially machined in two consecutive machining steps and a second surface of the workpiece is machined subsequently, a change of the virtual pivot axes takes place in response to transitioning between the two machining steps, in which the tip of the cutting plate machines a transition edge between the two surfaces. In response to the transition, a recess can furthermore be made by means of the tip of the cutting plate. The invention in particular relates to a cutting plate comprising at least three blades, which in each case extend along a circular arc line. The circular arc lines intersect in at least three points of intersection. The at least three cutting edges run at least on partial areas of such circular arc lines. A first cutting edge extends on a circular arc line from a point of intersection to another point of intersection and in each case adjoins a different cutting edge by forming an edge or a fillet. The first cutting edge is longer than the two other cutting edges, which, in turn, can also extend to a point of intersection of the circular arc lines, along which they run. However, provision is also made for these other cutting edges to only extend on partial lengths of the circular arc lines, thus for example transition into straight edges, in particular clamping edges, which intersect at a different location than the circular arc lines, which define the curve path of the cutting edges. The cutting plate can also have a trapezoidal outline. Provision is in particular made for the points of intersection of the circular arc lines or of the smoothly running cutting edges to be located on the corners of an irregular polygon, in particular an isosceles, but not equilateral triangle. The invention relates in particular to a cutting plate comprising two blades extending along a circular arc line, wherein the two circular arc lines intersect in two points of intersection. Here, the cutting edges can also extend across the entire circular arcs, thus free from kinks from point of intersection to point of intersection. However, provision is also made for the two cutting edges to extend only across partial areas of the circular arc lines. However, they adjoin one another at one of the two points of intersection. Such a cutting plate is in particular part of a monoblock tool, in the case of which the cutting plate is fixedly connected or solder-connected, respectively, to the holder. Such a monoblock tool can form a cutting-off bit, for example. The cutting edges are then preferably segments of the cutting plate. The holder is preferably pivoted by a separate pivot drive. Provision is also made to use an available axis as pivot axis for the holder of the cutting plate for adjusting the angularity of a milling head, by means of which a milling tool is otherwise rotated about an adjusting axis as intended. This axis is used to pivot the holder. The cutting plate according to the invention can be clamped onto the holder and has a cutting edge, which is curved in the broadside plane so as to differ from the cross sectional contour line of the surface to be machined. The cutting tool can be a cutting insert comprising two parallel broadsides. One broadside, however, can also be embodied in a prismatic manner. The cutting insert can have two cutting edges, which meet in a tip. These two cutting edges form a cutting edge pair and serve in particular for the production of surfaces, which are at an angle with respect to one another. By means of a mirror symmetrical or point symmetrical design of the cutting insert, two or four cutting edge pairs can be implemented. The cutting edges preferably run along a curved line. The cutting edges of a cutting edge pair can run from a first point of intersection of the two cutting edges to a second point of intersection of the two cutting edges without kinks. The one or a plurality of cutting edges of the cutting plate can be located on circular arc lines. Two circular arc lines, which intersect in two points, can have the same radius. The cutting plate can have the shape of a bird's tongue, can thus have two tips, which are created by intersecting circular arc lines. However, the cutting plate can also have only one tip, but the latter is preferably created by two circular arc lines, which intersect there, in particular with the same radius. They can be positive cutting plates comprising a positive clearance angle. The broadside surface then transitions into the narrow side surfaces at an acute angle of smaller than 90°. It can also be a negative cutting plate, which has a clearance angle of 0°. In the cutting edge, the narrow side surface transitions into the broadside surface at a 90° angle. The cutting plate can have two, three, four or more circular arc lines. It can in particular be an S-plate or a T-plate. The circular arc lines can have the same or different radii. The radius of the circular arc lines of the cutting edges can be between 4 and 50 mm, but also between 10 and 30 mm, preferably between 10 and 20 mm. The cutting plate preferably has at least two cutting edges, which run on curved lines. The curved lines are preferably circular arc lines, wherein the circular arc has a radius of maximally 30 mm. The circular arc lines intersect in a point of intersection. This point of intersection can form a tip of the cutting plate. The cutting plate can also be rounded on its tip. The tangent angle in the point of intersection of the intersecting lines of curvature preferably have an angle of 90° or less than 90°. The tangent angle is preferably larger than 60°. It is sufficient, when the tangent angle is 1° smaller than the angle of the adjoining surfaces to be machined, thus for example 89°. The tangent angle is thus preferably in a range of between 61 and 89°. Due to this embodiment, a cylinder jacket surface can thus initially be machined in two directly subsequent machining steps, in each case in a rolling cutting movement, and, directly following this, a plane surface. The reverse machining order is also possible. The cutting plate is thereby initially brought into such a pivot position that its first cutting edge rolls along the cylinder jacket surface in response to the machining, until the machining point has reached the tip of the cutting plate and the tip is located in the transition edge between cylinder jacket surface and plane surface. In this position, a machining of the plane surface can either take place immediately by means of the other cutting edge. It is also possible, however, to create a recess in the edge in response to changing the cutting edges. In response to the change, only a slight pivoting of the cutting plate is required. The invention furthermore also comprises such cutting plates, the tangent angle of the lines of curvature of which, which define the cutting edges, is larger than 90° or smaller than 60°, respectively, in the tip area. However, the angle must be smaller than the angle of the adjoining surfaces to be machined. For example a truncated cone jacket surface, which adjoins the cylinder jacket surface, can be machined with such a cutting plate. Here, the machining also takes place in a first machining step, in which the cutting plate is pivoted about a first virtual pivot axis, which is located in the center of the line of curvature of the cutting edge to be machined. In a subsequent second machining step, the cutting plate is pivoted about a second virtual pivot axis, which is located in the center of the line of curvature of the second cutting edge. In both machining steps, the pivoting movement of the holder is overlapped by a lateral movement, the direction of which is provided by the contour of the surface to be machined. Provision is further made for a cutting plate to have three or more cutting edges, wherein the lines of curvature, which define the course of the cutting edges, also intersect in points of intersection here and the tangent angles are smaller than 90° at that location. Two of the cutting edges can end in clamping edges, which can abut on counter clamping edges of the holder, in order to fix the position of the cutting plate with respect to the holder. The clamping edges can run in a straight line or in a curved manner. Such a cutting plate can have three corners, wherein two corners are formed by tips of adjoining cutting edges. These two tips are spaced apart from one another by a first distance, which is larger or smaller than a second distance, by which the points of intersection of the two clamping edges are in each case spaced apart from the tips. Such a cutting plate has corner points, which are located on the corner points of an isosceles, but not equilateral triangle. For fastening to the holder, the cutting plate can have a counterbore hole or a clamping trough. Provision is also made for a tangential clamping of the cutting plate. The invention furthermore also comprises such triangular or square cutting plates, in the case of which three or four cutting edges, respectively, in each case transition into one another by forming points of intersection. However, the cutting plate can also be circular, for example have a diameter of 25 mm. Circular cutting plates can be used, the diameter of which is larger than 20 mm. The cutting plate can be made of at least one of the following materials: HSS, cermet, ceramic, hard metal, powder steel, CBN, PKD and CVD. The method according to the invention is suitable for the hard machining as well as for the soft machining, in particular of metallic workpieces. It is a modified rotating method. The device is a modified lathe comprising an electric controller, which is embodied, equipped or programmed, respectively, in such a way that the method, which is described above and which is described in the exemplary embodiments, is carried out by means of the lathe.

BRIEF DESCRIPTION OF THE DRAWINGS

An exemplary embodiment of the invention will be discussed below by means of enclosed drawings.

FIG. 1 shows the setup of a device for the rotational machining of a workpiece in a roughly schematic manner, FIG. 2 shows a cutting edge 4 of a cutting plate 6 in a machining position at a workpiece 2 according to a first exemplary embodiment of a machining method in an enlarged manner, FIG. 3 shows the section according to the line III-III in FIG. 2, FIG. 8 shows an illustration according to FIG. 7 after a further rolling advancement movement, FIG. 9 shows an illustration according to FIG. 8 after a further rolling advancement movement, FIG. 10 shows an illustration according to FIG. 9 after a further rolling advancement movement, FIG. 11 shows an illustration according to FIG. 10 after a further rolling advancement movement, FIG. 37 shows a further exemplary embodiment of the invention in a top view onto the pivot axis 9.

DESCRIPTION OF THE EMBODIMENTS

Figure 4:
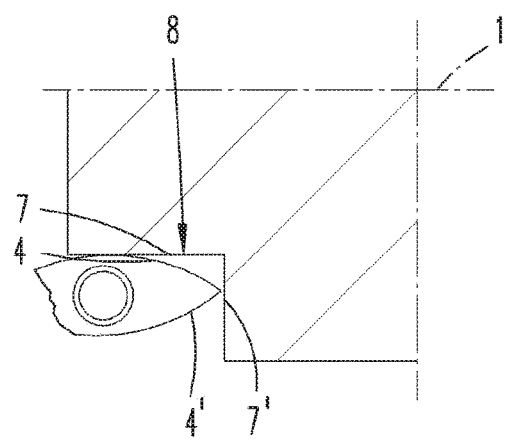
FIG. 4 shows an illustration according to FIG. 2, but after a rolling advancement movement of the cutting plate 6.
Figure 5:
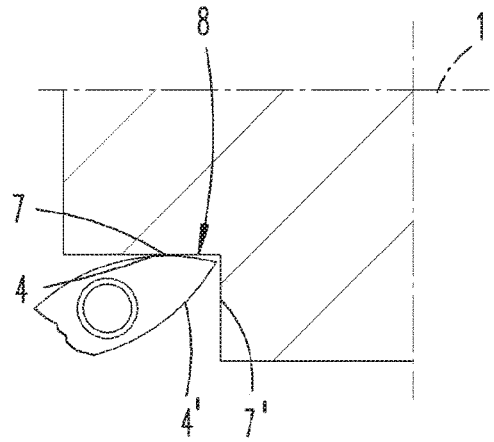
FIG. 5 shows an illustration according to FIG. 4 after a further rolling advancement movement.
Figure 6:
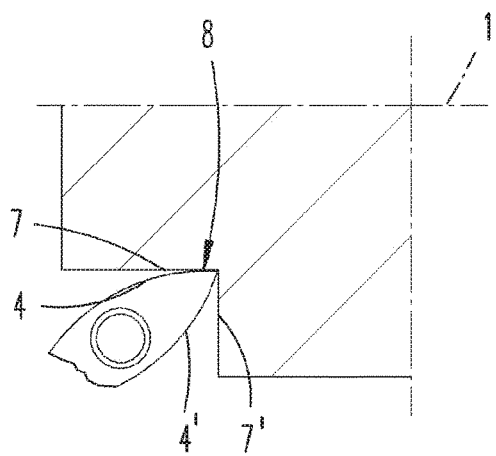
FIG. 6 shows an illustration according to FIG. 5 after a further rolling advancement movement.

FIG. 1 shows the elements of rotational machine, namely a workpiece spindle comprising a chuck 10, which can be rotationally driven about a rotational axis 1, in a roughly schematic manner. The chuck 10 supports a workpiece 2, which is to be machined in a rotationally symmetrical manner and which can additionally be held by a sleeve 11 on its side located opposite the chuck 10.

A non-illustrated cross carriage, which can be displaced in a movement plane, is arranged on the machine bed. The movement plane is spanned by the Z direction, in which the workpiece rotational axis 1 runs and by an X direction, which is perpendicular thereto. The cross carriage can be displaced in the X-Z plane by drive spindles, which are perpendicular to one another. Said cross carriage can thereby be displaced on an arc path by simultaneously driving both spindles. The cross carriage supports a pivot drive, which has a pivot axis 9, which runs in the Y axis. The pivot axis 9 is thus located perpendicular to the movement plane of the cross carriage. With the pivot drive, a holder 5 can be pivoted about the pivot axis 9. The pivot drive for pivoting the holder 5 about the axis 9 and for displacing the cross carriage in the two linear directions X and Z is controlled by a control device 12. The control device 12 is an electronic, in particular digital control device, which controls the axes according to a control program. The pivot drive can be a servo motor comprising an angular rotary encoder. The control device 12 is set up in such a way that the holder 5 can be brought into a predetermined pivot position by means of the servo motor. Provision is in particular made for the holder 5 to be capable of being pivoted about a defined angle from a first pivot position into a second pivot position. A rotational machining can be carried out in both pivot positions or during the pivoting.

The holder 5 supports a cutting insert 6. The cutting insert 6 has two cutting edges 4, 4', which intersect in a point and which run in an arc-shaped manner. The two cutting edges 4, 4' form a cutting edge pair. Provision is made for two or four cutting edge pairs, which can be brought into a machining position by turning the cutting plate 6. In the case of the exemplary embodiment, two cutting edges 4, 4', which in each case run in an arc-shaped manner, intersect in a first and in a second point of intersection, wherein the two points of intersection form tips of the cutting plate 6, which are located diametrically opposite one another.

The cutting edges 4, 4' are located in a plane. This is the plane, in which the broadside surface 13 of the cutting plate 6 extends. The broadside surface 13 is located in the X-Z plane, thus in the movement plane of the holder 5. In the case of the exemplary embodiment, the workpiece rotational axis 1 is located in the plane, which his defined by the broadside surface 13. This plane is a cutting edge plane.

The two cutting edges 4, 4' are formed by the edge of the cutting plate 6, at which a narrow side wall 14 and the broadside surface 13 meet. The cutting plate 6 is located in a receiving recess of the holder 5, which is adapted in shape, and is held in a clamping seat by a clamping claw 15 and is held in a clamping seat by a clamping claw 15, a clamping finger and/or eccentric pin or screw. The cutting plate can also be formed by a monoblock tool (special tool), for example a cutting-off bit.

A first exemplary embodiment of a machining method will be discussed by means of FIGS. 2 to 11. FIG. 2 shows a rotationally symmetrical tool 2, which has a cylinder jacket surface 7 and a front surface 7', which is perpendicular thereto. The font surface 7' runs in the rotational plane of the workpiece rotational axis 1.

With the help of the above-described delivery device, consisting of the cross carriage and the pivot drive, the holder or the cutting plate 6 supported by it, respectively, is brought into the position illustrated in FIG. 2, in which the curved cutting edge 4 is tangential to the surface 7 to be machined at a machining point 8. On the machining point 8, a chip is removed from the surface 7 to be machined by means of the rotational movement of the workpiece 2 about the workpiece rotational axis 1 by means of the cutting edge 4.

For the purpose of the advancement, the cutting edge 4 moves along the surface 7 to be machined in a rolling movement, which is attained by means of a simultaneous arc-shaped displacement of the pivot drive in the X-Y axis and a pivoting of the holder 5 about the pivot axis 9 of the pivot drive. The machining point 8 thereby moves from the position illustrated in FIG. 2 into the position illustrated in FIG. 4. In response to the rolling advancement, the machining point moves into the position illustrated in FIG. 6, in which it is approximated to the surface 7' to be machined at the transition edge of the surface 7 to be machined, via the intermediate position illustrated in FIG. 5.

Figure 7:
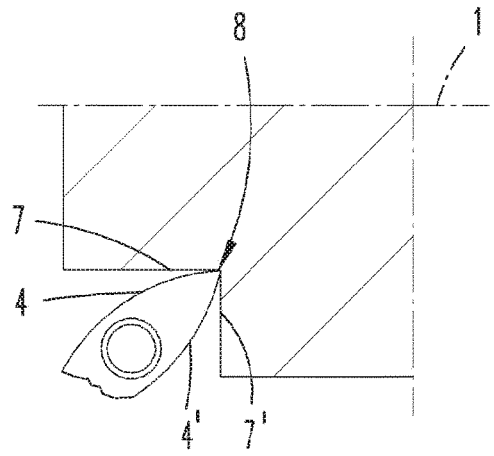
FIG. 7 shows an illustration according to FIG. 6 in response to a change of the machining cutting edges.

FIG. 7 clarifies the change of the cutting edge 4, which is in cutting engagement to the cutting edge 4', in order to machine the plane surface 7'. The tip, in which the cutting edges 4, 4' meet, thereby machines the transition edge between the surfaces 7, 7', which is located along a circular arc line around the workpiece rotational axis 1 and in the rotational plane.

To machine the surface 7', the cutting edge 4' rolls on the surface 7' to be machined from the position illustrated in FIG. 7 via the intermediate positions illustrated in FIGS. 8 to 10 into the end position illustrated in FIG. 11 from radially inside to radially outside across the entire surface 7' to be machined.

In response to the machining of the two surfaces 7, 7' using the cutting edges 4, 4', the machining point 8, thus the section of the cutting edge 4, 4', which engages with the surface 7, 7' to be machined in a tangential manner, moves continuously and without breaks in time along the surface 7, 7' to be machined and the cutting edge 4, 4'.

The use of the entire length or at least of a large section of the cutting edges 4, 4' for the rotational machining for removing chips leads to a wear-reduced machining. In that the cutting edges 4, 4' run in one plane, they can be reground.

In the exemplary embodiment, the cutting edges 4, 4' are curved convexly. They have a positive curvature. The cutting edges 4, 4', however, can also run in a straight line, thus have a curvature 0 or can be curved concavely, thus have a negative curvature. The intensity of the curvature depends on the curvature of the surface 7, 7' to be machined in the machining plane, thus in the advancement plane of the cutting plate 6, or the cutting edge plane, respectively. If, for example, a spherical surface is to be matched, the cutting edge can in fact have a negative curvature or the curvature 0. However, the curvature value is always larger than the curvature value of the surface to be machined in the machining plane. The line of curvature, which defines the course of the cutting edge 4, 4', can be formed by different radii, which transition into one another, or by a different smooth contour line, for example an elliptical or involute curve, but also by a cycloid. The course of the cutting edge 4, 4' in the cutting edge plane, however, is preferably defined by a line of curvature, which extends along a circular arc line.

The relative movement of the cutting edge 4, 4' along the surface 7, 7' to be machined can be an exact rolling movement. The rolling movement according to the invention, however, also comprises such relative movements of the cutting edges 4, 4' with respect to the surface 7, 7' to be machined, in which the pure rolling movement is overlapped by an advancement movement of the X-Z surface. The cutting edge 4, 4' thereby has a relative movement with respect to the workpiece 2 along the contour line of the surface 7, 7' to be machined. In the exemplary embodiment, this would in each case be a linear movement transversely and in the direction of the workpiece rotational axis 1. This is provided in particular when surfaces 7, 7' are to be machined, which are longer than the respective cutting edge 4, 4' in advancement direction.

The method according to the invention is not only more wear-resistant. It also creates a constant cutting force. Compared to a recessing methods, in the case of which the entire cutting edge length is used on the contour plane, it thus leads to a reduced heating of the tool. In contrast to similar methods from the prior art, larger advancement values can be attained with a consistent surface quality. The method can be carried out with reversible cutting plates, which can be resharpened.

Figure 12:
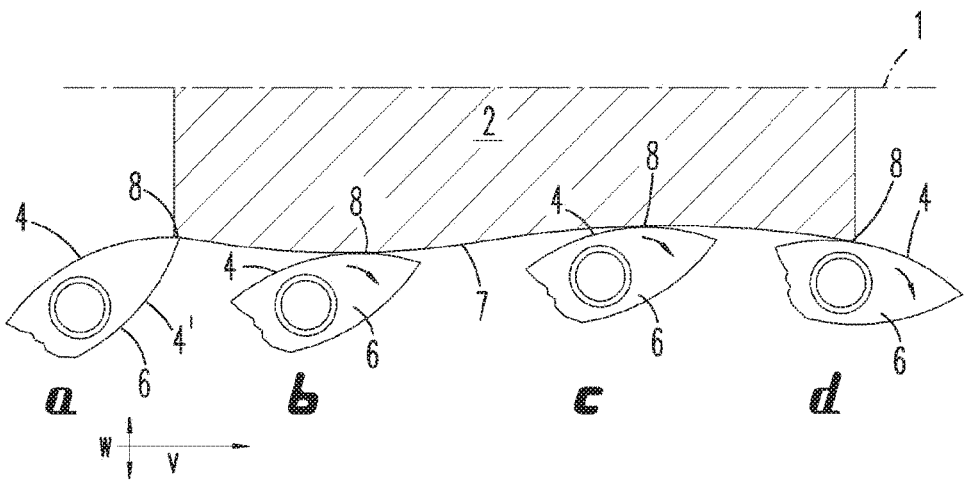
FIG. 12 shows a second exemplary embodiment of the machining method, in which the different positions of a cutting plate 6 are illustrated in four consecutive phases a, b, c, d, in response to the machining of a freely formed surface 7 of a workpiece 2.

In the case of the second exemplary embodiment illustrated in FIG. 12, the cutting plate 6 is continuously pivoted about the pivot axis 9 during the advancement movement, which has a component in X direction w and a component in Z direction v. This pivoting movement is overlapped by a lateral movement of the cutting plate 6 and in particular of the non-illustrated pivot axis 9 or the corresponding pivot drive, respectively, which extends along the contour line of the surface to be machined. In the case of the exemplary embodiment illustrated in FIG. 12, the machining point 8 moves from right to left on the cutting edge 4 with a lower speed than the machining point 8 moves from left to right along the surface 7 to be machined. It is also possible, however, to not displace the cutting plate 6 from left to right, but from right to left, but to maintain the pivoting movement of the cutting plate 6, which overlaps this displacement. It is further possible to overlap the two movements in such a way that the machining point 8 moves more slowly along the surface 7 to be machined than on the cutting edge 4.

As in the case of the other above-described method examples, the rotational machining is carried out here by using continuously pivoting tool 6.

Figure 13:
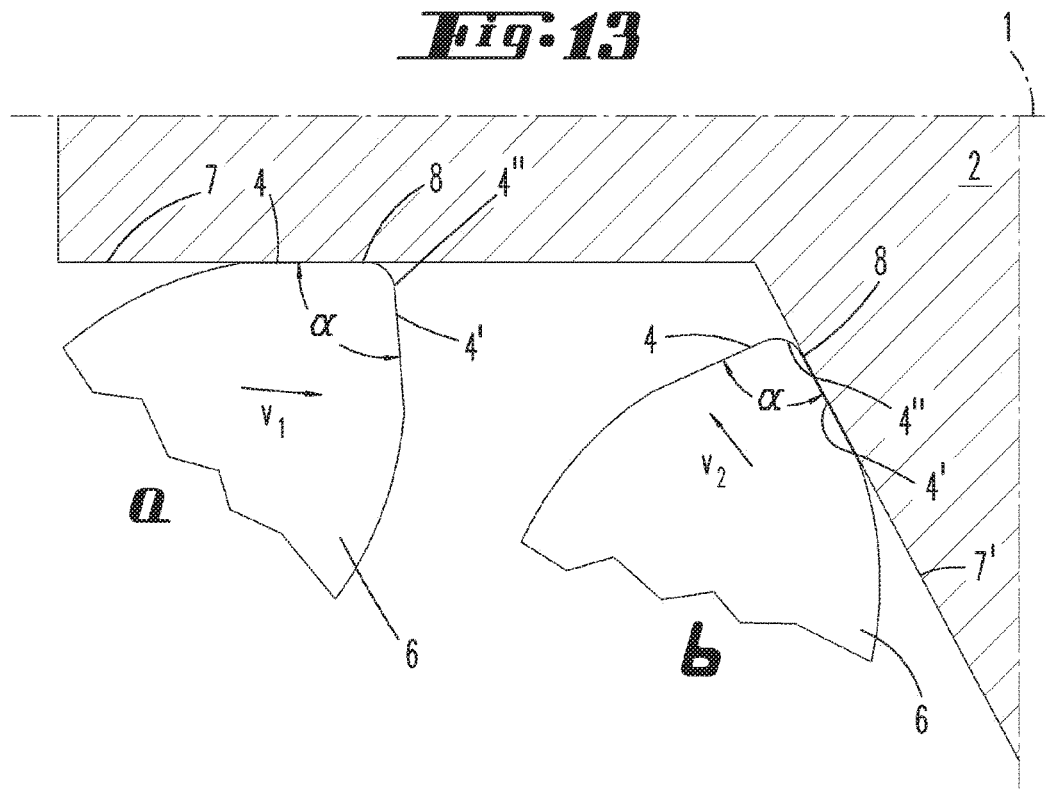
FIG. 13 shows an illustration similar to FIG. 12 relating to a third exemplary embodiment of the machining method, in which the cutting plate 6 is provided between two machining phases a, b.

In the case of the third exemplary embodiment, which is illustrated in FIG. 13, two surfaces 7, 7' to be machined of a workpiece 2 are made by means of a cutting plate 6. The surface 7 to be machined can be a cylinder jacket surface. The surface 7' to be machined can be a truncated cone surface. However, one of the two surfaces can also be a plane surface.

The cutting plate 6 has a tip 4", which forms the main cutting edge. So-called wiper cutting edges 4, 4', which in each case run in a straight line, adjoin the rounded tip cutting edge 4". The wiper cutting edges 4, 4' are located downstream from the tip cutting edges 4"—based on the cutting direction provided by the advancement direction $V_1$, $V_2$—so that the main machining capacity is reached by the tip cutting edges 4" and the wiper cutting edges 4, 4' substantially only have a smoothing function. The angle α between the two wiper cutting edges 4, 4' is approximately 90°–1°, thus 89°.

The method is divided into two rotational machining steps a, b. In the exemplary embodiment, the cutting plate 6 is linearly displaced in the direction of the advancement $V_1$ without being pivoted, along the surface to be machined during the first rotational machining step a, so that the machining point 8 remains on the cutting edge 4" in a stationary manner. The cutting edge 4', which runs in a straight line and which abuts on the surface 7, which has just been machined, in a plane manner, has a smoothing function.

The second surface 7″ to be machined is machined in a second rotational machining step b. For this purpose, the cutting plate 6 is first pivoted in such a way that the cutting edge 4 (wiper cutting edge), which runs in a straight line, abuts on the surface 7′ in linear abutment. Here, the advancement takes place in the direction $V_2$, so that the main machining capacity is provided by the tip-side, curved cutting edge 4″ and so that the cutting edge 4′, which runs in a straight line, only carries out a smoothing function.

It is considered to be advantageous that two surfaces, which have a different angle to the rotational axis of the workpiece, can be made using a tool 6, which is only brought into different pivoting positions. Here, the pivoting also occurs around a pivot axis, which runs substantially perpendicular to the rotational axis of the workpiece 2. However, a recess or an undercut can also be produced.

Figure 14:
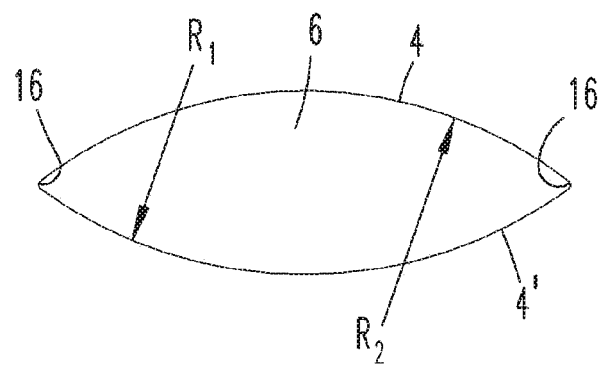
FIG. 14 shows a first exemplary embodiment of a cutting plate.

FIG. 14 shows an exemplary embodiment of a cutting plate 6. It is a cutting plate in the shape of a bird's tongue, comprising two cutting edges 4, 4′ of the same design, which in each case extend on circular arc lines with a radius $R_1$ or $R_2$, respectively. The radii $R_1$ and $R_2$ can be identical. However, they can also be different or can be variable. The cutting plate 6 thus only has two cutting edges 4, 4′, which meet in opposite tips 16.

Figure 15:
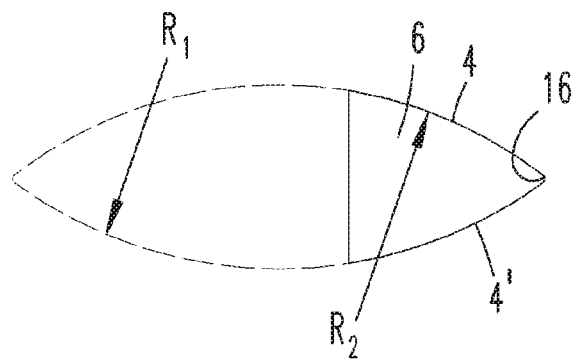
FIG. 15 shows a second exemplary embodiment of a cutting plate.

FIG. 15 relates to a second exemplary embodiment of a cutting plate 6. Here, the cutting edges 4, 4′ also run along curved lines, which in each case run on circular arcs with the same radii $R_1$, $R_2$. The cutting edges 4, 4′, however, do not extend from tip to tip, thus from point of intersection to point of intersection, of the two circular arc lines, but meet only in a tip 16. Such a cutting plate is used in particular where narrow available spaces do not permit a long cutting plate 6, as it is illustrated in FIG. 14.

Figure 16:
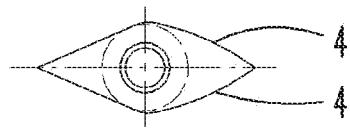
FIG. 16 shows an illustration of a cutting plate in the form of a single-blade cutter.

FIG. 14 shows a two-blade cutter and FIG. 15 shows a one-blade cutter. FIG. 16 also shows a one-blade cutter comprising two cutting edges 4, which meet in a tip and which run on a circular arc line with a curvature radius of 19 mm.

Figure 17:
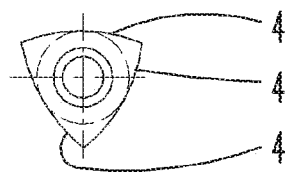
FIG. 17 shows a cutting plate in the form of a three-blade cutter.

FIG. 17 shows a cutting plate, which is approximately triangular in the top view, which forms a total of three cutting edges, wherein two adjacent cutting edges in each case intersect in one point and all cutting edges 4 are formed by circular arc lines with an arc radius of 19 mm.

Figure 18:
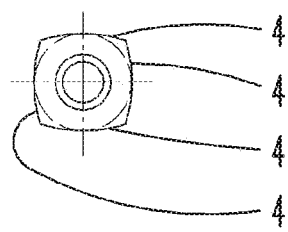
FIG. 18 shows a cutting plate in the form of a four-blade cutter.

FIG. 18 shows a cutting plate, which is approximately square in the top view, in the case of which a total of four cutting edges 4, which run along circular arc lines, in each case intersect with an adjacent cutting edge 4 in a point of intersection. Here, the cutting edges also run along circular arc lines with an arc radius of 19 mm. All cutting plates of FIGS. 16 to 18, but also the one according to FIG. 14, can have a central opening, through which a fastening screw or a fastening pin can be inserted.

Figure 19:
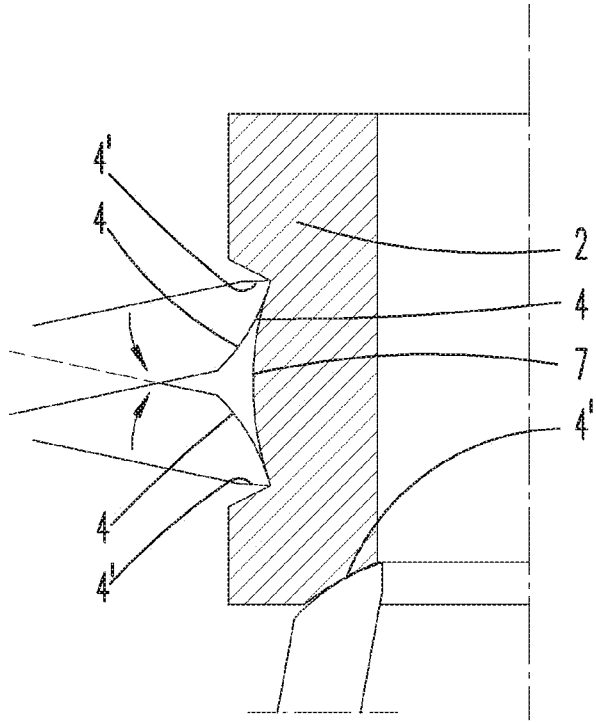
FIG. 19 shows an exemplary embodiment, in which the cutting plate is a monoblock tool and a spherical cylinder surface is rotated.

FIG. 19 shows two cutting tools in the form of a special tool. It is a monoblock tool with mirror-image cutting edges 4, 4′, which in each case run on a circular arc line. During the machining of the workpiece 2, the cutting plate is pivoted on an arc-shaped advancement path as well as about a pivot angle, so that the cutting edge 4 moves over the surface 7, which is to be machined in a spherical manner, in a rolling movement. Reference numeral 4′ identifies the cutting edge of the same tool, but in a different pivot angle, in order to carry out a front surface machining.

Figure 20:
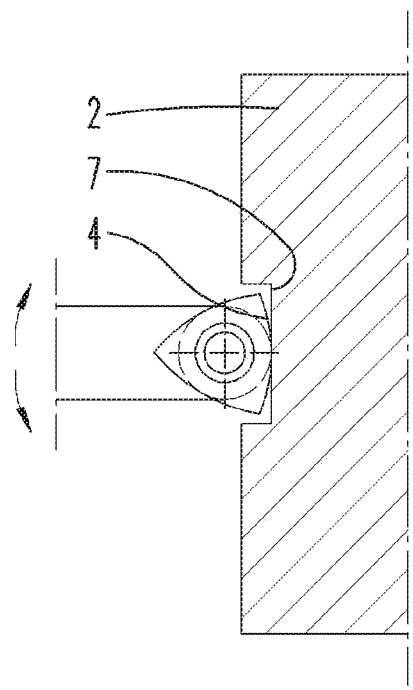
FIG. 20 shows the use of a three-blade cutter for creating a groove.

FIG. 20 shows the machining of a workpiece 2 with a three-blade cutter, as it is illustrated in FIG. 17. The cutting edge 4, which extends along a circular arc line, only carries out a rolling movement with respect to the workpiece 2 in response to the machining. The width of the groove, which is created thereby in the workpiece 2, thus the length of the surface 7 to be machined, in axial direction, has the same length, as the arc distance between the two end edges of the cutting edge 7.

Figure 21:
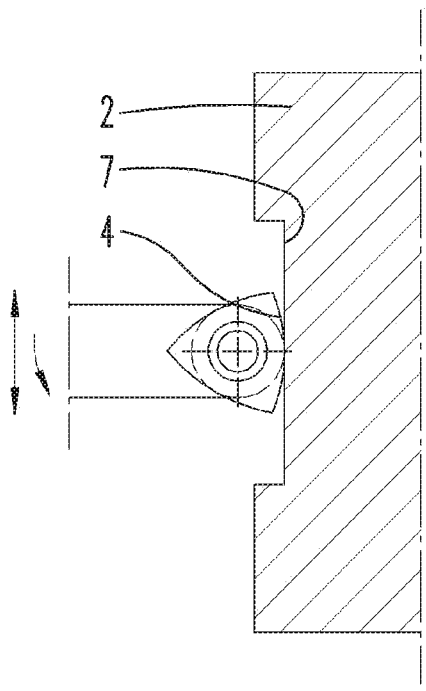
FIG. 21 shows the use of a three-blade cutter for creating a wider groove.

FIG. 21 also shows a three-blade cutter according to FIG. 17 in response to milling a circumferential groove into a workpiece 2. The axial length of the surface 7 to be machined, thus the groove width, is larger here than the length of the cutting edge 4. Here the cutting edge 4 also rolls along the surface 7 to be machined as a result of a pivoting movement of the cutting plate. In addition, this cutting plate movement is overlapped with a linear advancement direction in axial direction.

Figure 22:
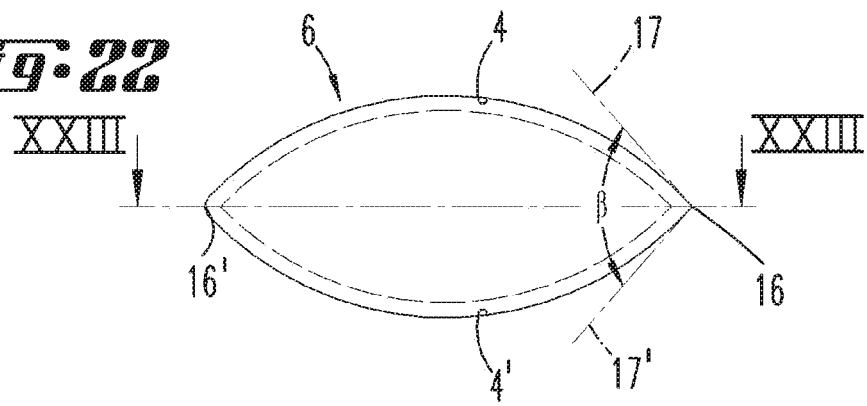
FIG. 22 shows a further exemplary embodiment of a cutting plate in the top view.
Figure 23:
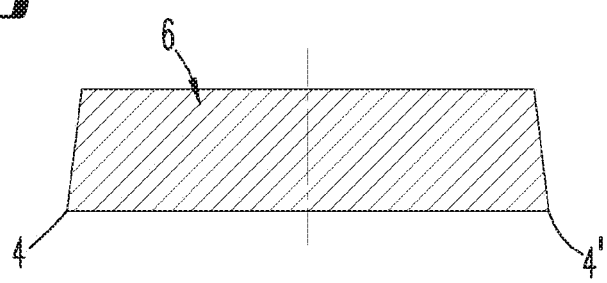
FIG. 23 shows the section according to the line XXIII-XXIII in FIG. 22.

FIGS. 22 and 23 show a cutting insert comprising two cutting edges 4, 4′, which extend along circular arc lines. It follows from the cross sectional illustration in FIG. 23 that this is a positive cutting insert 6. The cutting edges 4, 4′ run on circular arc lines, which intersect in two corner points 16, 16′. The cutting edge is rounded in the point of intersection 16′. In the point of intersection 16, the cutting edges meet one another by forming a transition edge. The transition edge forms a tip. Tangents 17 are additionally illustrated in FIG. 22. They are tangents, at the circular arc lines, which define the cutting edges 4, 4′, in their point of intersection. The angle β of the tangents 17, 17′ is smaller than 90°, for example 89° and smaller.

Figure 24:
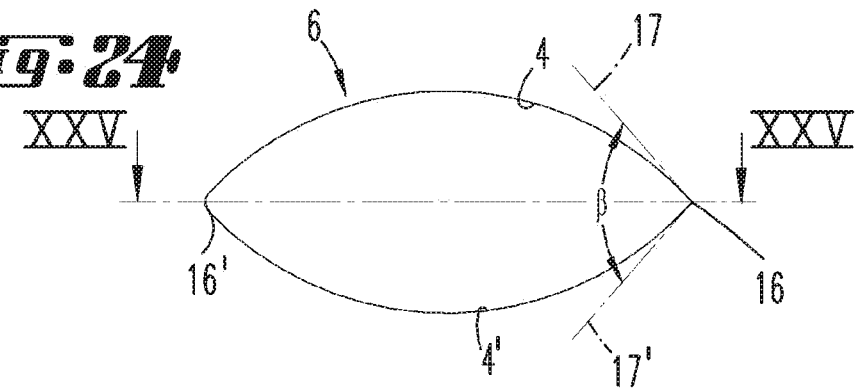
FIG. 24 shows a further exemplary embodiment of a cutting plate in the top view.
Figure 25:
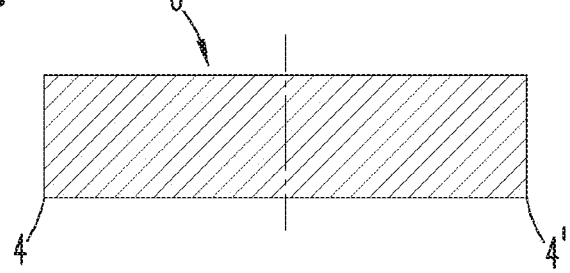
FIG. 25 shows the section according to the line XXV-XXV in FIG. 24.

FIGS. 24 and 25 show a negative cutting insert 6. Here, the cutting edges 4, 4′ or the lines of curvatures which create them, respectively, also have tangents 17 in their point of intersection, which at an angle β of <90°.

Figure 26:
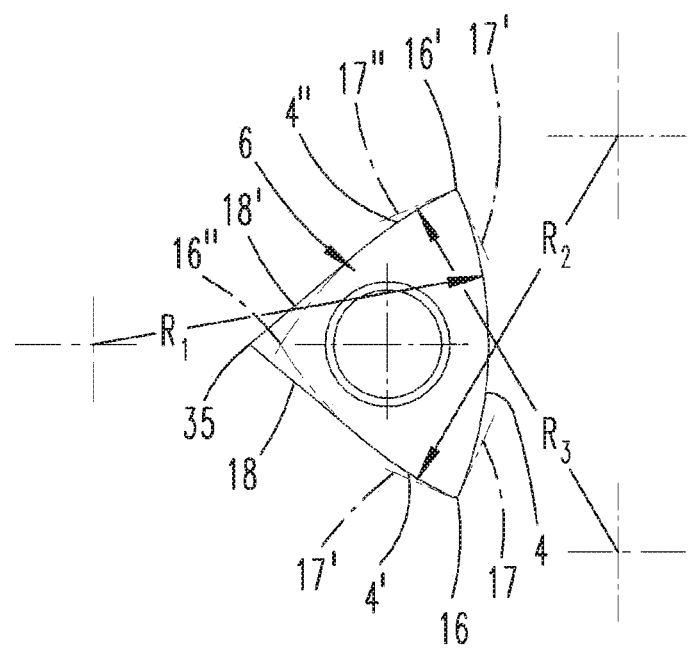
FIG. 26 shows a further exemplary embodiment of a cutting plate in the top view.

FIG. 26 shows a cutting insert 6 comprising a total of three cutting edges 4, 4′, which in each case run on curved lines. The cutting edge 4 extends between two corner points 16, 16′, at which the cutting edge 4′ meets with cutting edge 4 or the cutting edge 4″ meets with the cutting edge 4, respectively. The tangent angle in the area of the points of intersection 16 is <=90°, if the tangent angle is less than 90°. The course of the cutting edges 4, 4′, 4″ is defined by circular arc lines with the radii $R_1$, $R_2$, $R_3$. The cutting edge 4′ runs along a circular arc line, which is defined by the radius $R_1$. The cutting edge 4′ runs on a circular arc line, which is defined by the radius $R_2$. The cutting edge 4″ runs on a circular arc line, which is defined by the radius $R_3$. The circular arc line defined by the radius $R_1$ is intersected by the circular arc lines defined by the radii $R_2$ and $R_3$ in the points of intersection 16, 16′. In the point of intersection 16, the cutting edge 4 meets the cutting edge 4′ and the cutting edge 4″ in the point of intersection 16′. The tangents 17, 17′, 17″ at the cutting edges 4, 4′, 4″ in the points of intersection 16, 16′ are positioned at an angle of <90° with respect to one another. The tangents 17, 17′, 7″ are positioned at an angle of <90° with respect to one another. The cutting edges 4′ or 4″, respectively, transition without kinks into clamping edges 18, 18″, which run in a straight line and which meet at a point of intersection 35. The line of curvature with the radii $R_1$, $R_2$, in contrast, intersect in a point of intersection 16″. The points of intersection 16, 16′, 16″ are thus located on the corner points of an irregular polygon. This is an isosceles, but not an equilateral triangle.

Figure 27:
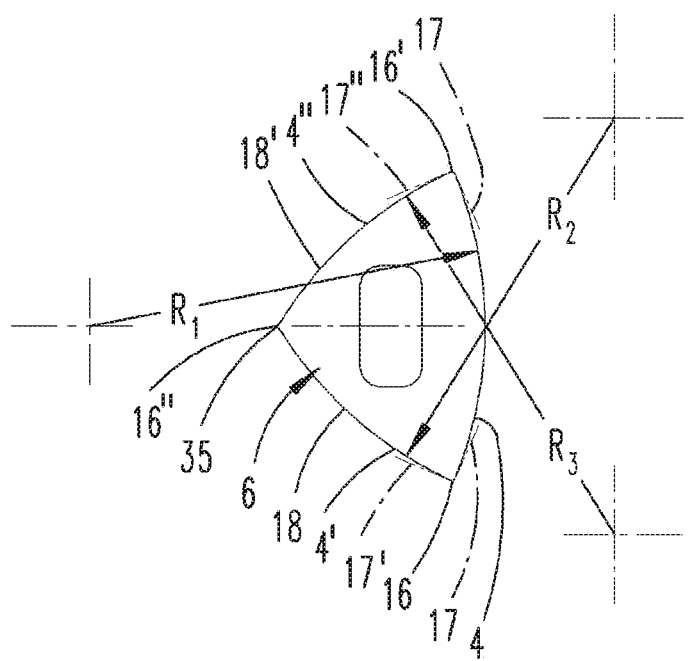
FIG. 27 shows a further exemplary of a cutting plate in the top view.

FIG. 27 also shows a cutting plate 6, which forms three cutting edges 4, 4′, 4″. Here the cutting edge 4 in each case also meets a different cutting edge 4′, 4″ in two points of intersection 16, 6′, wherein the cutting edges 4′, 4″ transition into one another by forming a corner point 35. In the area of the corner point 35, the edges of the cutting plate 6 form clamping edges 18. Here, the clamping edges 18 run on curved lines. In the case of this exemplary embodiment, the cutting edges 4, 4', 4" do not only partially extend across the lines of curvatures, which create them, but from point of intersection 16 to 16' or from 16 to 16", respectively, and from 16' to 16", along the lines of curvatures determined by the radii $R_1$, $R_2$, $R_3$, the corner points 16, 16', 16" of which are also located on the corner points of an irregular polygon here. Here, the corner point 35 coincides with the point of intersection 16" of the circular arc lines, which define the course of the cutting edges 4', 4". Here, the angle between the tangents 17, 17', 17" in the area of the points of intersection 16, 16' is also slightly less than 90°.

Figure 28:
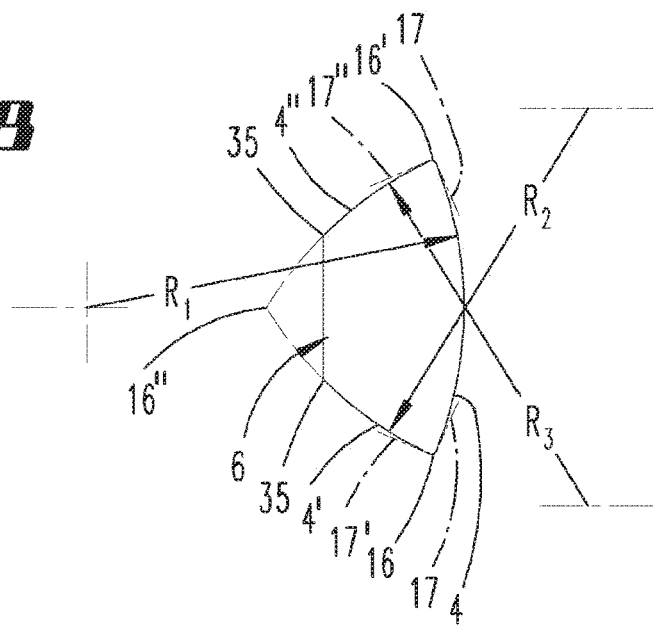
FIG. 28 shows a further exemplary of a cutting plate in the top view.

FIG. 28 shows a cutting plate, the cutting edges 4, 4', 4" of which extend along circular arc lines, which have the radii $R_1$, $R_2$, $R_3$. The corner points of the cutting edges 4, 4', 4" are located on the corner points of a trapezoid. In contrast, the points of intersection 16, 16', 16" of the circular arc lines, which define the course of the cutting edges 4, 4', 4" of the cutting edge plane, are located on the corner points of an isosceles triangle. The distance between the points of intersection 16, 16' equals the distance between the points of intersection 16', 16", but is shorter than the distance of the points of intersection 16, 16'. The cutting edges 4' and 4" in each case extend from a point of intersection 16 or 16' to an inflection point 35. Between the two inflection points 35, the edge of the cutting plate 6 runs in a straight line approximately parallel to an imaginary connecting straight between the points of intersection 16, 16'.

Figure 29:
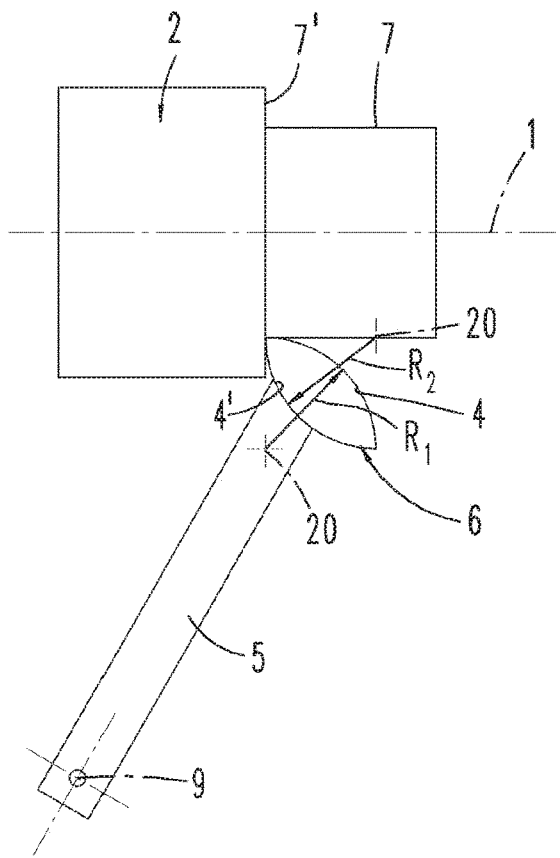
FIG. 29 shows an illustration for instance according to FIG. 1 of a further exemplary embodiment.

FIG. 29 shows a workpiece 2, which can be rotationally driven about a rotational axis 1, and a cutting insert 6, by means of which a cylinder jacket surface 7 and a directly adjoining plane surface 7' can be turned down. For this purpose, the cutting insert 6 has two cutting edges 4, 4', which in each case run on curved lines with a radius $R_1$, $R_2$. The two radii $R_1$, $R_2$ can be identical. The radii $R_1$, $R_2$ define centers 20, 20', which represent virtual pivot axes, about which the cutting plate 6 is pivoted in response to the respective machining. The cutting plate 6 is fixedly connected to a holder 5, which can be pivotably driven about a pivot axis 9, wherein a pivot drive of the pivot axis 9, which is not illustrated here, can be displaced in the paper plane. The lateral displacement in the paper plane is matched to the pivoting movement about the pivot axis 9 in such a way that the cutting insert rolls with the cutting edge about the center 20 of the radius $R_1$ in response to the machining of the cylinder jacket surface 7 and rolls with the cutting edge 4' about the center 20' of the radius $R_2$ in response to the machining of the plane surface 7', wherein the center 20, 20' in each case moves parallel to the surface 7, 7'.

Figure 30:
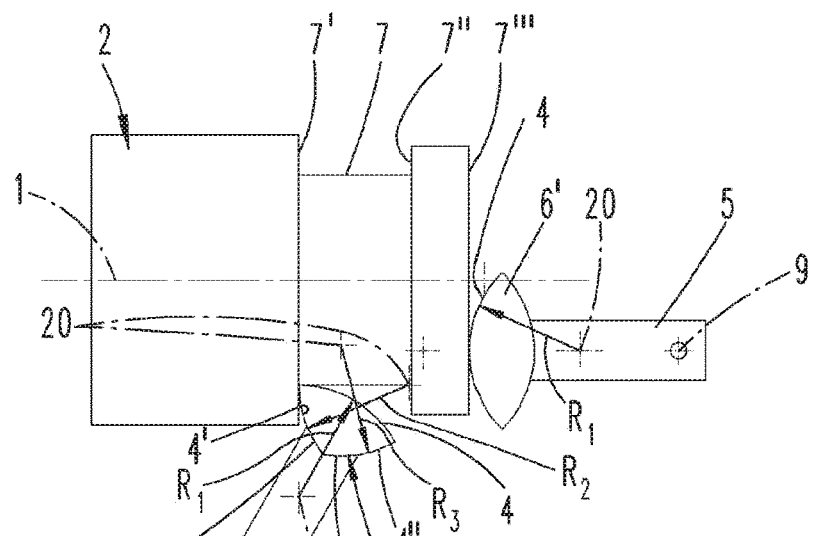
FIG. 30 shows an illustration similar to FIG. 1 of a further exemplary embodiment.

FIG. 30 shows an exemplary embodiment, in the case of which a plane surface 7" is located opposite the plane surface 7 and a plane surface 7'" is located opposite the plane surface 7". The plane surface 7" can be machined using a cutting edge 4". In a first machining step, for example the plane surface 7" is machined using the cutting edge 4', in that the cutting plate is pivoted about the center 20 of the radius $R_2$, wherein the center moves parallel to the plane surface 7". Immediately following this, the cylinder surface 7 is machined using the cutting edge 4, wherein the cutting plate is pivoted about the center of the radius $R_1$. The latter moves in axial direction of the rotational axis 1, so that the cutting edge 4 rolls on the cylinder jacket surface 7. Following this, the plane surface 7" is machined by using the cutting edge 4". Here, the machining also takes place in a rolling manner.

In response to the machining of a plurality of surfaces 7, 7', 7" to be machined, the cutting plate 6 rolls about rolling axes, which are locally different from one another and which are in each case defined by the centers 20 of the curvature radii $R_1$, $R_2$, $R_3$ of the assigned cutting edges 4, 4', 4".

The plane surface 7'" is made by a separate tool, which has a cutting plate 6', by using a cutting edge 4, which is curved about a center 20. Here, a holder 5 can also be pivoted about a pivot axis 9 and can be displaced in the plane in such a way that the cutting edge 4 rolls about a virtual rolling axis 20 on the plane surface 7'".

Figure 31:
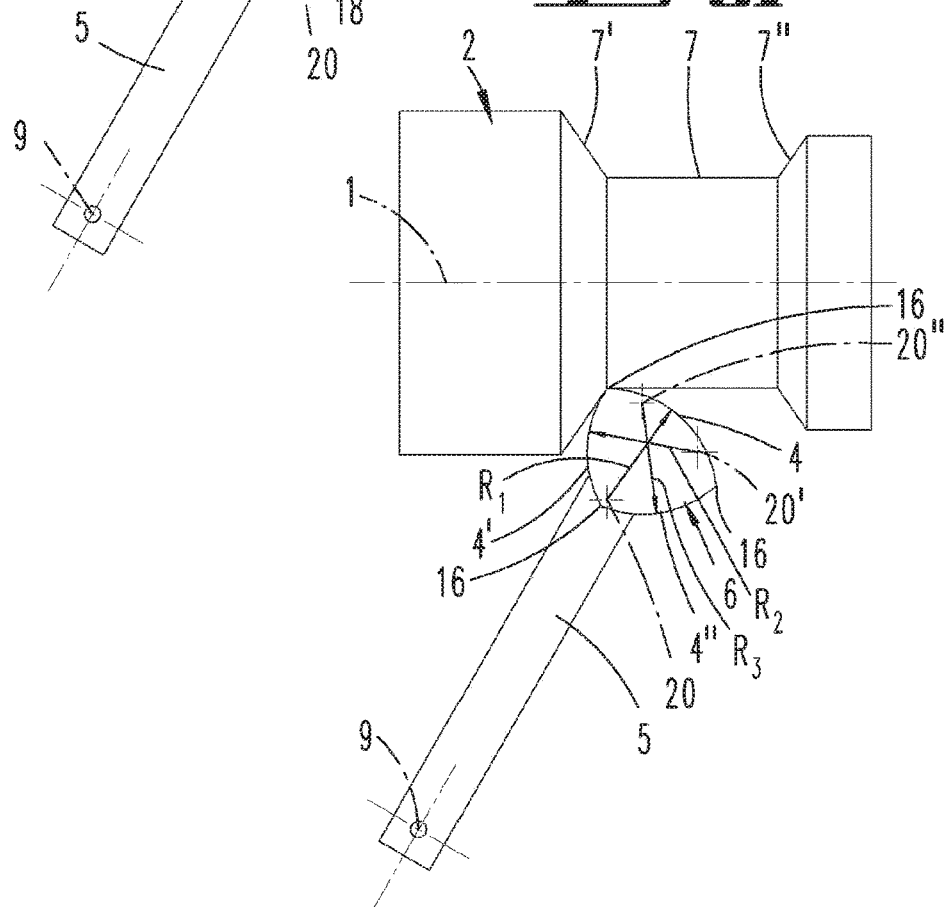
FIG. 31 shows an illustration according to FIG. 1 of a further exemplary embodiment.

While the tangent angles β in the tips of the cutting edges are <90° in the exemplary embodiments of FIGS. 29, 30, the tangent angles in the tip 16 of the cutting plate 6 are larger than 90°, but smaller than the angle between the two surfaces 7, 7' to be machined, in the exemplary embodiment illustrated in FIG. 31. Opposite truncated cone jacket surfaces 7', 7", which are machined by using cutting edges 4" or 4', respectively, adjoin the cylinder jacket surface 7. In the case of this machining, the cutting edges 4, 4', 4" also roll about virtual rolling axes 20, 20', 20".

Figure 32:
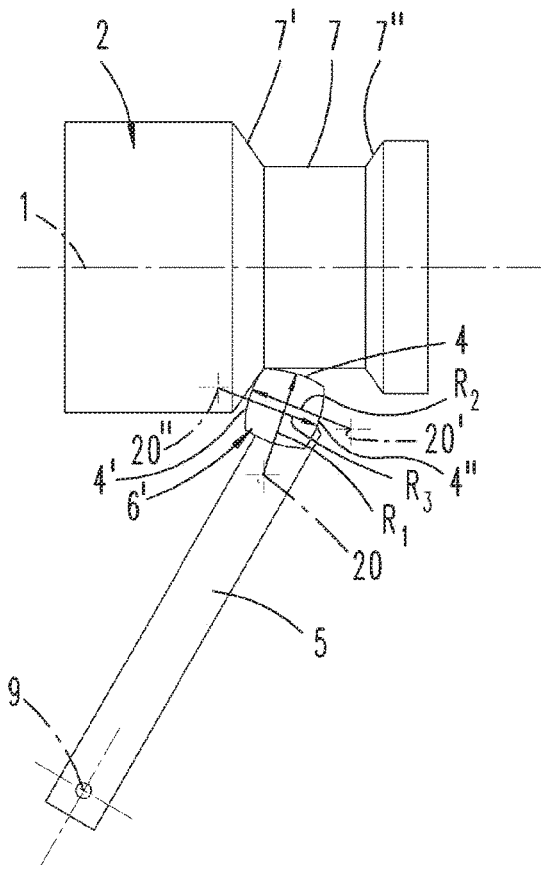
FIG. 32 shows an illustration according to FIG. 1 of a further exemplary embodiment.

In the exemplary embodiment illustrated in FIG. 32, the cutting plate has four cutting edges, which in each case run along circular arc lines. Only three cutting edges are used, namely in order to machine a cylinder jacket surface 7 and two adjoining truncated cone jacket surfaces 7', 7". The points of intersection of the circular arc lines, which define the course of the cutting edges 4, 4', 4" here, are located on the corner points of a square. They can also be corner points of an irregular rectangle. Provision is further also made for a cutting plate to be used, in the case of which the circular arc lines, which define the course of the cutting edges, are located on the corner points of a pentagon or of a hexagon. The pentagon or the hexagon can be regular or irregular.

Figure 33:
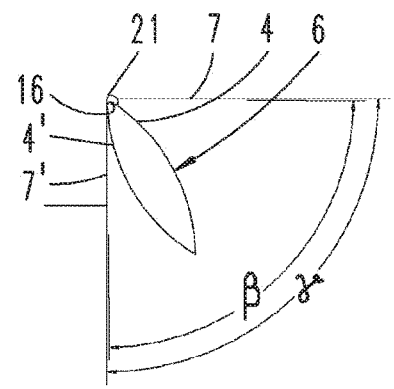
FIG. 33 shows the engagement of a cutting plate 6 in the area between two surfaces 7, 7' to be machined.

FIG. 33 shows an exemplary embodiment, in which a cylinder jacket surface 7 and an adjoining plane surface 7' are machined. In the transition area between the cylinder jacket surface 7 and the plane surface 7', an undercut 21 is made by using the tip 16 of the cutting plate 6. Not only the tangent angle β is illustrated here, but also the angle γ, in which the plane surface 7' strikes the cylinder jacket surface 7. The tangent angle β is 89° and the angle γ between the two surfaces 7, 7' is 90°.

Figure 34:
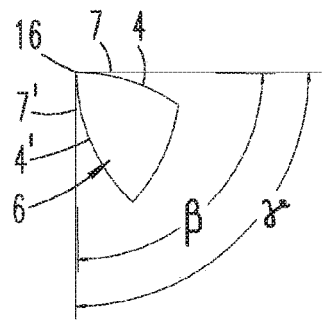
FIG. 34 shows an illustration according to FIG. 33 of a further exemplary embodiment.

The exemplary embodiment illustrated in FIG. 34 shows a thin cutting insert 6, in the case of which the tangent angle is smaller than 60°, so that an inner cone surface 7" can be made, which is adjoined by a cylinder jacket surface 7, wherein the angle between inner cone surface 7' and cylinder jacket surface 7 is 60°.

Figure 35:
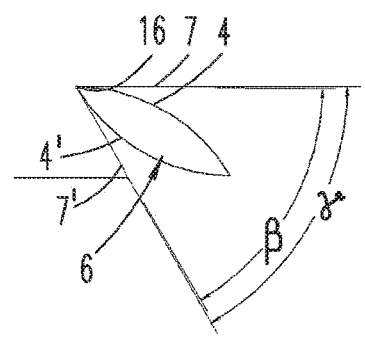
FIG. 35 shows an illustration according to FIG. 33 of a further exemplary embodiment.

The exemplary embodiment illustrated in FIG. 35 shows the use of a cutting plate 6, which only has a tip 16, wherein the two cutting edges 4, 4' abut in the tip by forming a tangent angle β of 89°, in order to machine two surfaces, which are positioned at a surface angle γ of 90° to one another.

Figure 36:
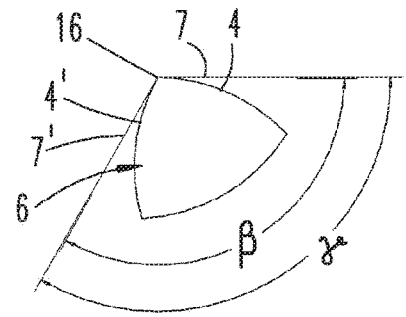
FIG. 36 shows an illustration according to FIG. 33 of a further exemplary embodiment.

The exemplary embodiment illustrated in FIG. 36 also shows a cutting insert comprising only one tip 16. Here, the tangent angle β, against which the cutting edges 4, 4' strike in the tip, is 119°, so that a cylinder jacket surface 7 and an adjoining truncated cone surface 7', which are positioned at an angle of 120°, can be made by using this cutting insert.

As a general rule, the tangent angle is only slightly smaller, in particular by approximately 1°, than the angle between the two surfaces to be machined.

In the exemplary embodiment illustrated in FIG. 37, a milling spindle 32 of a milling head is used in order to implement the pivot drive of the holder 5. The cutting insert 6 can be laterally displaced in the paper plane with respect to the workpiece 2 by means of an advancement drive 34. The holder 5 can simultaneously be pivoted about the pivot axis 9 of the milling spindle 32, so that the cylinder jacket surface 7 and the two plane surfaces 7', 7" can be machined by means of the cutting plate 6.

The above statements serve to explain the inventions, which are captured as a whole by the application and which further develop the prior art at least by means of the following feature combinations, in each case also independently, namely:

A method, which is characterized in that the cutting plate 6 is pivoted about a pivot axis 9, which is perpendicular in the advancement plane, during the machining or between two machining steps.

A method, which is characterized in that a machining point 8 moves along the cutting edge 4, 4', which is curved so as to differ from the contour line of the surface 7, 7' to be machined, as a result of the rolling movement component.

A method, which is characterized in that the cutting plate 6 has a first cutting edge 4, which is brought into a machining engagement with a first surface 7 of the workpiece 2 in a first machining step, and has a second cutting edge 4', which is brought into a machining engagement with a second surface 7' to be machine of the workpiece 2 in a second machining step after a pivoting of the cutting plate 6 about the pivot axis 9.

A method, which is characterized in that the cutting edge 4, 4' is located in a cutting edge plane 3, the plane normal of which runs perpendicular to the rotational axis 1 of the workpiece 2.

A method, which is characterized in that the rotational axis 1 of the workpiece 2 runs in the cutting edge plane 3 or in a parallel plane to the cutting edge plane 3.

A method, which is characterized in that the holder 5 is pivoted on an arc path about a rolling axis.

A method, which is characterized in that the cutting plate movement has at least one pivoting movement about the pivot axis 9, which is moved in the cutting edge plane 3.

A method, which is characterized in that the rolling cutting plate movement consists of an overlapping of a pure rolling movement and a longitudinal displacement of the cutting plate 6 along the contour line of the surface 7, 7' to be machined.

A method, which is characterized in that the cutting plate 6 is moved with an advancement movement and is pivoted about the pivot axis 9 in such a way that the machining point 8 moves along the surface 7, 7' to be machined at a speed, which is larger or smaller than the speed, at which the machining point 8 moves along the cutting edge 4, 4'.

A device, which is characterized by a pivot drive, by means of which the cutting plate 6 can be pivoted about a pivot axis 9, which is perpendicular in the advancement plane, during the machining or between two machining steps.

A device, which is characterized in that the advancement drive and the pivot drive is set up or can be set up in such a way that the cutting edge 4, 4' carries out a rolling movement in response to the machining of the surface 7, 7' to be machined, whereby the machining point 8 moves along the cutting edge 4, 4'.

A device, which is characterized in that the plane normal of the cutting edge plane 3 runs perpendicular to the rotational axis 1 and/or that the rotational axis 1 runs in the cutting edge plane 3 or in a parallel plane thereto.

A device, which is characterized in that the holder 5 can be pivoted about the pivot axis 9, the position of which can be displaced in the cutting edge plane 3.

A cutting plate, which is characterized in that the cutting edge 4, 4' extends along a circular arc line, which extends in the pane of the broadside surface 13.

A cutting plate, which is characterized in that at least two cutting edges 4, 4' extend along two contour lines, which are formed by intersecting circles with a radius $R_1$, $R_2$, wherein the cutting edges 4, 4' transition into one another in the area of at least one point of intersection of the contour lines, if applicable by forming a fillet.

A cutting plate, which is characterized in that the cutting plate is a cutting insert comprising two cutting edge pairs 4, 4' or four cutting edge pairs 4, 4'.

A cutting plate, which is characterized in that the cutting edge plate has at least one of the following materials: HSS, cermet, ceramic, hard metal, powder steel, CBN, PKD, CVD.

A device, which is characterized in that, by using the pivot drive 25, 32, a pivot angle can be realized, which is so large that a first surface 7 of the workpiece 2 can be machined in a first machining step by using a first one of the two cutting edges 4 with a machining point 8, which moves along the first cutting edge 4, and that an at least second surface 7' of the workpiece can then be machined in an at least second machining step by using an at least second one of the two cutting edges 4, 4', wherein the machining point 8 moves along the second cutting edge 4' and the second surface 7' to be machined.

A method, which is characterized in that a first surface 7 of the workpiece 2 is machined in a first machining step by using a first one of the two cutting edges 4 with a machining point 8, which moves along the first cutting edge 4, and that an at least second surface 7' of the workpiece 2 is then machined in an at least second machining step by using an at least second one of the two cutting edges 4, 4', wherein the machining point 8 moves along the second cutting edge 4' and the second surface 7' to be machined.

A device or a method, which are characterized in that the rotational axis 1 of the workpiece 2 runs in the cutting edge plane 3 or in a parallel plane to the cutting edge plane 3.

A device or a method, which are characterized in that the first or second surface 7, 7' is a cylinder jacket surface, a plane surface, a truncated cone jacket surface or a convexly or concavely curved surface and that the two surfaces 7, 7' are positioned at an angle of <180° to one another and directly adjoin one another or are spaced apart from one another.

A device or a method, which are characterized in that the distance of the pivot axis 9 of the holder 5 from the cutting edge 4, 4', 4" is larger than the radius $R_1$, $R_2$, $R_3$ of the cutting edge, preferably at least twice as large, as the radius of the cutting edge.

A device or a method, which are characterized in that the two cutting edges 4, 4' in each case extend along circular arc lines, the centers 20 of which are virtual pivot axes, about which the cutting plate 6 pivots in response to both of the machining steps, wherein the virtual pivot axis 20 is displaced in a contour-parallel manner to the surfaces 7, 7' to be machined.

A device, which is characterized in that the cutting edge 4, 4' has a curvature radius, which is smaller than the distance of the pivot axis 9 of the holder 5 from the cutting edge 4, 4', and the holder 5 can additionally be displaced in the advancement plane with a movement component in a direction transverse to the rotational axis 1.

A method, which is characterized in that the cutting edge 4, 4' has a curvature radius, which is smaller than the distance of the pivot axis 9 of the holder 5 from the cutting edge 4, 4', and the holder 5 can additionally be displaced in the advancement plane with a movement component in a direction transverse to the rational axis 1.

A method or a device, which are characterized in that the lines of curvature, which define the course of the two cutting edges 4, 4', intersect in a point of intersection 16, 16' by forming a tangent angle α, which is smaller than a tangent angle β in the point of intersection of the surfaces 7, 7' to be machined in the cutting edge plane.

A method or a device, which are characterized in that the pivot axis 23 is embodied by an actuating axis 32 for adjusting the angle of a milling head of a machine tool.

A method or a device, which are characterized in that the cutting plate 6 is moved with an advancement movement and is pivoted about the pivot axis 9 in such a way that the machining point 8 moves along the surface 7, 7' to be machined at a speed, which is larger or smaller than the speed, at which the machining point 8 moves along the cutting edge 4, 4'.

A cutting plate, which is characterized in that the angle β of two tangents 17, which abut on the lines of curvatures in the point of intersection 16, is smaller than or equal to 90°, preferably smaller than 90°.

A cutting plate, which is characterized by two cutting edges 4, 4', which in each case extend along a line of curvature, in particular circular arc line, wherein the two lines of curvatures, in particular circular arc lines, intersect in two points of intersection 16, 16'.

A cutting plate, which is characterized in that the points of intersection 16, 16', 16" of the circular arc lines are located on the corners of an irregular polygon, in particular on the corners of an isosceles, but not equilateral triangle.

A cutting plate, which is characterized in that the other cutting edges 4, 4" transition into straight clamping edges 18 in a kink-free manner or by forming edges.

A cutting plate, which is characterized in that the clamping edges run along a straight line or along a curved line.

A cutting plate, which is characterized in that the two cutting edges 4, 4' run along circular arc lines, which intersect in two points of intersection, wherein the cutting plate 6 forms tips 16 in the area of both points of intersection.

A cutting plate, which is characterized in that the cutting plate has at least one of the following materials: HSS, cermet, ceramic, hard metal, powder steel, CBN, PKD, CVD.

The invention furthermore relates to the use of a cutting plate in one of the described embodiments for the rotational machining of a rotationally symmetrical workpiece with a method of the above-described type.

All disclosed features (alone, but also in combination with one another) are significant for the invention. The disclosure content of the corresponding/enclosed priority documents (copy of the prior application) in its entirety is hereby included in the disclosure of the application, also for the purpose of adding features of these documents into claims of the application at hand. With their features, the subclaims characterize independent inventive further developments of the prior art, in particular in order to file divisional applications on the basis of these claims.

List of Reference Numerals

| 1 | rotational axis | 18' | clamping edge |
| 2 | workpiece | 19 | fastening opening, |
| 3 | cutting edge plate | | counterbore hole |

-continued

List of Reference Numerals

| 4 | cutting edge | 20 | virtual pivot axis/ |
| 4' | cutting edge | | center, rolling axis |
| 4" | cutting edge | 20' | rolling axis, center |
| 5 | holder | 20" | rolling axis |
| 6 | cutting insert | 21 | undercut |
| 7 | cylinder jacket surface | 22 | tool carrier |
| 7' | front surface, plane, truncated cone surface | 32 | actuating axis |
| | | 33 | holder support |
| 7" | plane surface | 34 | advancement drive |
| 7''' | plane surface machining point | 35 | corner point, inflection point |
| | | 8 | point |
| 9 | pivot axis | $R_1$ | radius |
| 10 | chuck, clamping device | $R_2$ | radius |
| | | $R_3$ | radius |
| 11 | sleeve | $V_1$ | advance |
| 12 | control device | $V_2$ | advance |
| 13 | broadside surface | a | phase/rotational machining step |
| 14 | narrow side surface | | |
| 15 | clamping claw | b | phase/rotational machining step |
| 16 | tip, corner point, point of Intersection | | |
| | | c | phase |
| 16' | corner point, point of intersection | d | phase |
| | | v | direction |
| 16" | corner point, point of intersection | β | tangent angle |
| | | γ | workpiece angle |
| 17 | tangent | | |
| 17' | tangent | | |
| 17" | tangent | | |
| 18 | clamping edge | | |
| w | direction | | |
| z | direction | | |

The invention claimed is:

1. A device for machining a workpiece rotating about a rotational axis, comprising: a cutting plate that has at least two cutting edges that extend in a cutting edge plane and transition into one another in a tip; a holder, the cutting plate being fastened to the holder so that the cutting plate is engagable with a surface to be machined of the workpiece, the holder being pivotable about a pivot axis that is positioned perpendicular to an advancement plane of the cutting plate; and a control device that moves the holder using an advancement drive and pivots the holder using a pivot drive during the machining, the holder being displacable with respect to the workplace in a direction of the rotational axis with a movement component so that the machining point moves along the cutting edge and the surface to be machined in a rolling movement in the advancement plane, which is not intersected by the rotational axis, wherein the pivot drive is operative to pivot the holder at a pivot angle sufficient so that a first surface of the workpiece is machineable in a first machining step by a first one of the two cutting edges with a machining point that moves along the first cutting edge, and so that an at least second surface of the workpiece is machineable in an at least second machining step by an at least second one of the two cutting edges, wherein the machining point moves along the second cutting edge and the second surface to be machined, wherein the two cutting edges in each case extend along circular arc lines that have centers that form virtual pivot axes, about which the cutting plate pivots in response to both of the machining steps, wherein the virtual pivot axis is displaceable in a contour-parallel manner to the surfaces to be machined.

2. The device according to claim 1, wherein the rotational axis of the workpiece runs in a cutting edge plane or in a plane parallel to the cutting edge plane.

3. The device according to claim 1, wherein the first or second surface is a cylinder jacket surface, a plane surface, a truncated cone jacket surface or a convexly or concavely curved surface, respectively, and the two surfaces are positioned at an angle of <180° to one another and directly adjoin one another or are spaced apart from one another.

4. The device according to claim 1, wherein a distance of the pivot axis of the holder from the at least two cutting edges is larger than a radius of the at least two cutting edges.

5. The device according to claim 4, wherein the distance of the pivot axis of the holder from the cutting edge is at least twice as large as the radius of the cutting edge.

6. The device according to claim 1, wherein the pivot axis is a milling spindle.

7. The device according to claim 1, wherein the cutting plate is movable with an advancement movement and is pivotable about the pivot axis so that the machining point moves along the surface to be machined at a speed different than a speed at which the machining point moves along the cutting edge.

8. A device for machining a workpiece rotating about a rotational axis, comprising: a cutting plate that has at least two cutting edges that extend in a cutting edge plane and transition into one another in a tip; a holder, the cutting plate being fastened to the holder so that the cutting plate is engagable with a surface to machined of the workpiece, the holder being pivotable about a pivot axis that is positioned perpendicular to an advancement plane of the cutting plate; and a control device that moves the holder using an advancement drive and pivots the holder using a pivot drive during the machining, the holder being displacable with respect to the workpiece in a direction of the rotational axis with a movement component so that the machining point moves along the cutting edge and the surface to be machined in a rolling movement in the advancement plane, which is not intersected by the rotational axis, wherein the pivot drive is operative to pivot the holder at a pivot angle sufficient so that a first surface of the workpiece is machineable in a first machining step by a first one of the two cutting edges with a machining point that moves along the first cutting edge, and so that an at least second surface of the workpiece is machineable in an at least second machining step by an at least second one of the two cutting edges, wherein the machining point moves along the second cutting edge and the second surface to be machined, wherein lines of curvature, which define a course of the two cutting edges, intersect in a point of intersection by forming a tangent angle ($\alpha$), which is smaller than a tangent angle ($\beta$) in a point of intersection of the surfaces to be machined in the cutting edge plane.

9. A method for machining a workpiece rotating about a rotational axis, comprising the steps of: using a cutting plate that has at least two cutting edges that extend in a cutting edge plane and transition into one another in a point of intersection, wherein the cutting plate is fastened to a holder and is engaged with a surface to be machined of the workpiece: pivoting the holder about a pivot axis that is positioned perpendicular to an advancement plane of the cutting plate by a pivot drive during the machining; and displacing the holder with respect to the workpiece using an advancement drive in a direction of the rotational axis with a movement component so that the machining point moves along the cutting edge and the surface to be machined in a rolling movement component in the advancement plane, which is not intersected by the rotational axis, including machining a first surface of the workpiece in a first machining step by using a first one of the two cutting edges with a machining point, which moves along the first cutting edge, and then machining an at least second surface of the workpiece in an at least second machining step by using an at least second one of the two cutting edges, wherein the machining point moves along the second cutting edge and the second surface to be machined, wherein the two cutting edges in each case extend along circular arc lines that have centers that form virtual pivot axes, about which the cutting plate pivots in response to both of the machining steps, wherein the virtual pivot axis is displaceable in a contour-Parallel manner to the surface to be machined.

10. The method according to claim 9, wherein the rotational axis of the workplace runs in a cutting edge plane or in a plane parallel to the cutting edge plane.

11. The method according to claim 9, wherein the first or second surface is a cylinder jacket surface, a plane surface, a truncated cone jacket surface or a convexly or concavely curved surface, respectively, and the two surfaces are positioned at an angle of <180° to one another and directly adjoin one another or are spaced apart from one another.

12. The method according to claim 9, wherein a distance of the pivot axis of the holder from the at least two cutting edges is larger than a radius of the at least two cutting edges.

13. The method according to claim 9, wherein the distance of the pivot axis of the holder from the cutting edge is at least twice as large as the radius of the cutting edge.

14. The method according to claim 9, wherein the pivot axis is a milling spindle.

15. The method according to claim 9, wherein the cutting plate is movable with an advancement movement and is pivotable about the pivot axis so that the machining point moves along the surface to be machined at a speed different than a speed at which the machining point moves along the cutting edge.

16. A method for machining a workpiece rotating about a rotational axis, comprising the steps of: using a cutting plate that has at least two cutting edges that extend in a cutting edge plane and transition into one another in a point of intersection, wherein the cutting plate is fastened to a holder and is engaged with a surface to be machined of the workpiece; pivoting the holder about a pivot axis that is positioned perpendicular to an advancement plane of the cutting plate by a pivot drive during the machining; and displacing the holder with respect to the workpiece using an advancement drive in a direction of the rotational axis with a movement component so that the machining pivot moves along the cutting edge and the surface to be machined in a rolling movement component in the advancement plane, which is not intersected by the rotational axis, including machining a first surface workpiece in a first machining step by using a first one of the two cutting edges with a machining point, which moves along the first cutting edge, and then machining an at least second surface of the workpiece in an at least second machining step by using an at least second one of the two cutting edges, wherein the machining point moves along the second cutting edge and the second surface to be machined, wherein lines of curvature, which define a course of the two cutting edges, intersect in a point of intersection by forming a tangent angle ($\alpha$), which is smaller than a tangent angle ($\beta$) in a point of intersection of the surfaces to be machined in the cutting edge plane.

17. A device for machining a workpiece rotating about a rotational axis, comprising: a holder, which is pivotable about a pivot axis and holds a cutting plate, which has at least one cutting edge, which is curved in a cutting edge plane; a pivot drive for pivoting the holder; an advancement drive, by which the pivot drive is displaceable in an advancement plane, which runs perpendicular to the pivot axis extension and which is not intersected by the rotational axis, so that the holder is moved with a movement component parallel to the rotational axis with respect to the workpiece; and a control device for movement control of the advancement drive and the pivot drive so that a machining point moves along the cutting edge and the surface to be machined of the workpiece in a rolling movement, wherein the cutting edge has a curvature radius, which is smaller than a distance of the pivot axis of the holder from the cutting edge, and the holder is additionally displaceable in the advancement plane with a movement component in a direction transverse to the rational axis, wherein lines of curvature, which define a course of the two cutting edges, intersect in a point of intersection by forming a tangent angle ($\alpha$), which is smaller than a tangent ($\beta$) in a point of intersection of the surfaces to be machined in the cutting edge plane.

18. The device according to claim 17, wherein the pivot axis is a milling spindle.

19. The device according to claim 17, wherein the cutting plate is movable with an advancement movement and is pivotable about the pivot axis so that the machining point moves along the surface to be machined at a speed different than a speed at which the machining point moves along the cutting edge.

20. A method for machining a workpiece rotating about a rotational axis, comprising the steps of: holding a cutting plate, which has at least one cutting edge that is curved in a cutting edge plane, with a holder; pivoting the holder about a pivot axis by using a pivot drive; and providing the holder with a movement component parallel to the rotational axis with respect to the workplace by using an advancement drive by which the pivot drive is displaced in a advancement plane, which runs perpendicular to the pivot axis extension and which is not intersected by the rotational axis, for machining the workpiece so that a machining point moves along the cutting edge and the surface to be machined of the workpiece in a rolling movement, wherein the cutting edge has a curvature radius, which is smaller than a distance of the pivot axis of the holder from the cutting edge, and additionally displacing the holder in the advancement plane with a movement component in a direction transverse to the rational axis, wherein lines of curvature, which define a course of the two cutting edges, intersect in a point of intersection by forming a tangent angle ($\alpha$), which is smaller than a tangent angle ($\beta$) in a point of intersection of the surfaces to be machined in the cutting edge plane.

21. The method according to claim 20, wherein the pivot axis is a milling spindle.

22. The method according to claim 20, wherein the cutting plate is movable with an advancement movement and is pivotable about the pivot axis so that the machining point moves along the surface to be machined at a speed, which is larger or smaller than a speed, at which the machining point moves along the cutting edge.

23. A cutting plate for carrying out the method according to claim 20, comprising two cutting edges, which in each case extend along a line of curvature, wherein the two lines of curvature intersect in two points of intersection.

24. A cutting plate, comprising two cutting edges, which in each case extend along one of two lines of curvature, which intersect in a point of intersection and which transition into one another in an area of the point of intersection by forming an edge or a fillet, wherein an angle ($\beta$) of two tangents, which abut on the lines of curvatures in the point of intersection, is smaller than or equal to 90°.

25. The cutting plate according to claim 24, wherein the cutting plate has at least one of the following materials: HSS, cermet, ceramic, hard metal, powder steel, CBN, PKD, CVD.

26. A cutting plate for machining a workpiece rotating about a rotational axis, comprising at least three cutting edges, which in each case extend along a circular arc line, wherein the circular arc lines intersect in at least three points of intersection and a first cutting edge of the three cutting edges each case adjoins one of the two other cutting edges by forming an edge or a fillet, wherein the points of intersection of the circular arc lines are located on corners of an irregular polygon.

27. A cutting plate according to claim 26, wherein the points of intersection of the circular arc lines are located on corners of an isosceles, but not equilateral triangle.

28. The cutting plate according to claim 26, wherein the other cutting edges transition into straight clamping edges in a kink-free manner or by forming edges.

29. The cutting plate according to claim 28, wherein the clamping edges run along a straight line or along a curved line.

\* \* \* \* \*